US012537981B2

(12) United States Patent
Katsumata et al.

(10) Patent No.: US 12,537,981 B2
(45) Date of Patent: Jan. 27, 2026

(54) INFORMATION PROCESSING DEVICE AND METHOD THEREOF

(71) Applicant: Sony Group Corporation, Tokyo (JP)

(72) Inventors: Mitsuru Katsumata, Tokyo (JP); Mitsuhiro Hirabayashi, Tokyo (JP); Masaru Ikeda, Tokyo (JP); Takeshi Tsukuba, Tokyo (JP); Kenji Kondo, Tokyo (JP)

(73) Assignee: Sony Group Corporation, Tokyo (JP)

( * ) Notice: Subject to any disclaimer, the term of this patent is extended or adjusted under 35 U.S.C. 154(b) by 101 days.

(21) Appl. No.: 18/552,438

(22) PCT Filed: Apr. 11, 2022

(86) PCT No.: PCT/JP2022/017458
§ 371 (c)(1),
(2) Date: Sep. 26, 2023

(87) PCT Pub. No.: WO2022/220207
PCT Pub. Date: Oct. 20, 2022

(65) Prior Publication Data
US 2024/0163491 A1    May 16, 2024

Related U.S. Application Data

(60) Provisional application No. 63/174,096, filed on Apr. 13, 2021.

(51) Int. Cl.
*H04N 21/231* (2011.01)
*H04N 21/234* (2011.01)
(Continued)

(52) U.S. Cl.
CPC ..... *H04N 21/231* (2013.01); *H04N 21/23418* (2013.01); *H04N 21/44008* (2013.01); *H04N 21/4402* (2013.01)

(58) Field of Classification Search
CPC .......... H04N 21/231; H04N 21/23418; H04N 21/44008; H04N 21/4402; H04N 21/85406; H04N 19/70; H04N 21/84
See application file for complete search history.

(56) References Cited

U.S. PATENT DOCUMENTS

2012/0160556 A1\* 6/2012 Jang ............... H04N 21/234363
2015/0288996 A1\* 10/2015 Van Der Schaar ..........................
H04N 21/234831
(Continued)

FOREIGN PATENT DOCUMENTS

EP     3160154 A1 \*  4/2017  ............ G06F 21/10
JP     2020-150156 A    9/2020
(Continued)

OTHER PUBLICATIONS

International Search Report and Written Opinion mailed on Jun. 21, 2022, received for PCT Application PCT/JP2022/017458, filed on Apr. 4, 2022, 9 pages including English Translation.
(Continued)

*Primary Examiner* — Anthony Bantamoi
(74) *Attorney, Agent, or Firm* — XSENSUS LLP

(57) ABSTRACT

The present disclosure relates to an information processing device and a method, in which an image quality improvement technology required for reproducing contents can be easily used.
Image quality improvement technology information regarding an image quality improvement technology for improving an image quality of an image to be encoded is generated, a content file storing the encoded data of the image is generated, and the image quality improvement technology information is stored in the content file. Furthermore, encoded data of an image to be reproduced is acquired from a content file on the basis of the image quality improvement technology information regarding an image quality improvement
(Continued)

technology for improving an image quality of an image, and the encoded data is decoded. The present disclosure can be applied to, for example, an information processing device, an information processing method, or the like.

20 Claims, 25 Drawing Sheets

(51) Int. Cl.
*H04N 21/44* (2011.01)
*H04N 21/4402* (2011.01)

(56) References Cited

U.S. PATENT DOCUMENTS

| | | |
|---|---|---|
| 2017/0339408 A1 | 11/2017 | Kang |
| 2019/0222822 A1* | 7/2019 | Wang .................... G06F 16/282 |

FOREIGN PATENT DOCUMENTS

| | | |
|---|---|---|
| WO | 2019/087905 A1 | 5/2019 |
| WO | 2019/193097 A1 | 10/2019 |
| WO | 2020/058570 A1 | 3/2020 |

OTHER PUBLICATIONS

"Text of ISO/IEC FDIS 23009-1 4th edition", ISO/IEC JTC 1/SC 29/WG 11 N18609, Aug. 12, 2019, pp. 1-276.

Bross et al., "Versatile Video Coding (Draft 10)", Joint Video Experts Team (JVET) of ITU-T SG 16 WP 3 and ISO/IEC JTC 1/SC 29/WG 11, JVET-S2001-v, Jun. 22-Jul. 1, 2020, pp. 1-502.

"Information technology—Coding of audio-visual objects—Part 15: Carriage of network abstraction layer (NAL) unit structured video in the ISO base media file format", ISO/IEC JTC 1/SC 29, ISO/IEC FDIS 14496-15:2014(E), Jan. 13, 2014, pp. 1-173.

Chujoh et al., "AHG9/AHG11: Neural network based super resolution SEI", Joint Video Experts Team (JVET) of ITU-T SG 16 WP 3 and ISO/IEC JTC 1/SC 29, JVET-T0092-v1, Oct. 7-16, 2020, pp. 1-3.

Chujoh et al., "AHG9/AHG11 Level information for super-resolution neural network", Joint Video Experts Team (JVET) of ITU-T SG 16 WP 3 and ISO/IEC JTC 1/SC 29, JVET-U0053-v2, Jan. 6-15, 2021, pp. 1-6.

"Information technology—JPEG 2000 image coding system—Part 12: ISO base media file format Information", ISO/IEC JTC1/SC29N, Feb. 20, 2015, pp. 1-291.

"Information technology—Coded representation of immersive media (MPEGI)—Part 2: Omnidirectional media format", ISO/IEC JTC 1/SC 29/WG 11, ISO/IEC FDIS 23090-2:201x (E), Apr. 26, 2018, 182 pages.

* cited by examiner

FIG. 1

| output_picture_upsampling_parameter_sei_message( payloadSize ) { | Descriptor |
|---|---|
| upsampling_parameter_idc | u(2) |
| upsampling_parameter_format_idc | u(6) |
| for ( i = 1; i < payloadSize; i++) { | |
| upsampling_parameter_payload_byte | b(8) |
| } | |
| } | | upsampling_parameter_idc specifies the value of the index of neural network parameters.
upsampling_parameter_format_idc specifies the format of the neural network parameter. For example, MPEG NNR [3] is a good format for compressed neural network parameters. Otherwise, ONNX (Open Neural Network eXchange) and NNEF (Neural Network Exchange Format) will be one of the candidates for parameter format.
upsampling_parameter_payload_byte is a byte of the payload type of the SEI message. According to the format which is specified by upsampling_paramter_format_idc, the bytes are decoded, and the neural network parameters are received.

FIG. 2

| nnr_level_sei_message( payloadSize ) { | Descriptor |
|---|---|
| nnr_level_idc | u(8) |
| nnr_parameter_scale | u(8) |
| } | | nnr_level_idc specifies the level information for the neural network processing based on the maximum byte size of neural network representation in Table 4 and the variable NNR_level which defines the complexity of neural network processing is set.
nnr_parameter_scale indicates the scaling factor for level information which is used to adjust the bit-depth of image pixel or the chroma format or the operational precision of neural network.

FIG. 3

| NNR_level | nnr_level_idc | Max_nnr_byte |
|---|---|---|
| 1 | 16 | 32768 |
| 2 | 32 | 65536 |
| 2.1 | 35 | 74632 |
| 3 | 48 | 131072 |
| 3.1 | 51 | 149263 |
| 4 | 64 | 262144 |
| 4.1 | 67 | 298527 |
| 5 | 80 | 524288 |
| 5.1 | 83 | 597053 |
| 5.2 | 86 | 679917 |
| 6 | 96 | 1048576 |
| 6.1 | 99 | 1194106 |
| 6.2 | 102 | 1359835 |

FIG. 4

| | |
|---|---|
| #1 | TRANSMIT IMAGE QUALITY IMPROVEMENT TECHNOLOGY INFORMATION |
| #1-1 | TRANSMIT DETERMINATION INFORMATION |
| #1-1-1 | TRANSMIT PARAMETER DATA |
| #1-2 | STORE IMAGE QUALITY IMPROVEMENT TECHNOLOGY INFORMATION IN FILE CONTAINER |
| #1-2-1 | STORE DETERMINATION INFORMATION IN VIDEO TRACK |
| #1-2-1-1 | STORE IN Box IN SampleEntry |
| #1-2-1-2 | USE restriction scheme |
| #1-2-1-3 | STORE PARAMETER DATA IN VIDEO TRACK |
| #1-2-1-3-1 | STORE IN Box IN SampleEntry |
| #1-2-1-3-2 | EXTEND SampleGroupEntry AND STORE PARAMETER DATA |
| #1-2-2 | STORE IMAGE QUALITY IMPROVEMENT TECHNOLOGY INFORMATION IN META TRACK |
| #1-3 | STORE IMAGE QUALITY IMPROVEMENT TECHNOLOGY INFORMATION IN MPD |
| #1-3-1 | STORE IMAGE QUALITY IMPROVEMENT TECHNOLOGY INFORMATION IN Representation |
| #1-3-1-1 | STORE IN SupplementalProperty |
| #1-3-1-2 | ASSOCIATE Video bitstream FILE WITH Representation |
| #1-4 | TRANSMIT IMAGE QUALITY IMPROVEMENT TECHNOLOGY INFORMATION FOR EACH region |
| #1-5 | TRANSMIT IMAGE QUALITY IMPROVEMENT TECHNOLOGY INFORMATION OF STILL IMAGE DATA |

FIG. 5

```
aligned(8) class ImageQualityImprovementInfomation {
    unsigned int(1) level_idc_flag;
    unsigned int(1) display_size_flag;
    unsigned int(6) reserved;
    utf8string type_uri;
    if (level_idc_flag){
        unsigned int(8) level_idc;
    if (display_size_flag){
        unsigned int(32) display_width;
        unsigned int(32) display_height;
    }
    unsigned int(8) quality;
    unsigned int (8) config_data_size;
    unsigned int (8*config_data_size) config_data;
}
```
~101

```
aligned(8) class ImageQualityImprovementData {
    unsigned int (8) data_size;
    unsigned int (8*data_size) data
}
```
~102

FIG. 7

```
aligned (8) class ImageQualityImprovementInfoBox extends
FullBox('iqii',0,0){
    ImageQualityImprovementInfomation();
}
```
~121

```
class VisualSampleEntry(codingname) extends SampleEntry (codingname){
    unsigned int(16) pre_defined = 0;
    const unsigned int(16) reserved = 0;
    unsigned int(32)[3] pre_defined = 0;
    unsigned int(16) width;
    unsigned int(16) height;
    template unsigned int(32) horizresolution = 0x00480000;  // 72 dpi
    template unsigned int(32) vertresolution = 0x00480000;  // 72 dpi
    const unsigned int(32) reserved = 0;
    template unsigned int(16) frame_count = 1;
    string[32] compressorname;
    template unsigned int(16) depth = 0x0018;
    int(16) pre_defined = -1;
    // other boxes from derived specifications
    CleanApertureBox clap;  // optional
    PixelAspectRatioBox pasp;  // optional
    ImageQualityImprovementInfoBox iqii;  // optional
}
```
~122

FIG. 11

```
aligned (8) class ImageQualityImprovementDataBox extends FullBox('iqid',0,0){
    ImageQualityImprovementData();
}
```
161

```
class VisualSampleEntry(codingname) extends SampleEntry (codingname){
    unsigned int(16) pre_defined = 0;
    const unsigned int(16) reserved = 0;
    unsigned int(32)[3] pre_defined = 0;
    unsigned int(16) width;
    unsigned int(16) height;
    template unsigned int(32) horizresolution = 0x00480000; // 72 dpi
    template unsigned int(32) vertresolution = 0x00480000; // 72 dpi
    const unsigned int(32) reserved = 0;
    template unsigned int(16) frame_count = 1;
    string[32] compressorname;
    template unsigned int(16) depth = 0x0018;
    int(16) pre_defined = -1;
    // other boxes from derived specifications
    CleanApertureBox clap; // optional
    PixelAspectRatioBox pasp; // optional
    ImageQualityImprovementInfoBox iqii; // optional
    ImageQualityImprovementDataBox iqid; //optional
}
```
162

```
aligned (8) class ImageQualityImprovementInfoBox extends FullBox('iqii',0,0){
    ImageQualityImprovementInfomation ();
}
```
163

FIG. 12

```
class ImageQualityImprovementDataEntry extends VisualSampleGroupEntry('iqid'){
    ImageQualityImprovementData();
}
```
171

```
class ImageQualityImprovementInfoEntry extends VisualSampleGroupEntry('iqii'){
    ImageQualityImprovementInfomation();
    ImageQualityImprovementData();
}
```
172

FIG. 14

```
aligned(8) class ImageQualityImprovementMetadataSampleEntry() extends MetadataSampleEntry ('iqim') {
    ImageQualityImprovementInformationBox();
}
```
201

```
aligned(8) class ImageQualityImprovementMetadataSample () {
    ImageQualityImprovementData();
}
```
202

FIG. 15

```
<MPD><Period>
<AdaptationSet >
<Representation id="100" bandwidth="500000" width="1920" height="1080">
<SupplementalProperty schemeIdUri="ImageQualityImprovementInformation" iqi:type_uri="urn:mpeg:vvc:postfilter:superresolution:2021"
iqi:level="32" iqi:display_width="3840" iqi:display_height="2160" iqi:quality="1"/>
<BaseURL> Video.mp4</BaseURL>
</Representation>
</AdaptationSet>
</Period></MPD>
```

FIG. 16

```
<MPD><Period>
<AdaptationSet > // AdaptationSet OF IMAGE QUALITY IMPROVEMENT TECHNOLOGY Meta track
  <Representation id="100" bandwidth="500" associationId="101">
    <SupplementalProperty schemeIdUri="ImageQualityImprovementInformation"
iqi:type_uri="urn:mpeg:vvc:postfilter:superresolution:2021" iqi:level="32" iqi:display_width="3840" iqi:display_height="2160"
iqi:quality="1"/>//
    <BaseURL> SuperResolutionMetadata.mp4</BaseURL>
  </Representation>
</AdaptationSet>
<AdaptationSet > //Video AdaptationSet
  <Representation id="101" bandwidth="500000" width="1920" height="1080">
    <BaseURL> Video.mp4</BaseURL>
  </Representation>
</AdaptationSet>
</Period></MPD>
```

```
aligned(8) class ImageQualityImprovementInfomation {
  utf8string type_uri;
  unsigned int(8) level_idc;
  unsigned int(32) display_width;
  unsigned int(32) display_height;
  unsigned int(8) quality;
  unsigned int(8) target_region_type;
  unsigned int(8) target_region_num;
  for (i=0; i< target_region_num){
    unsigned int(16) target_region_id;
  }
  unsigned int (8) config_data_size;
  unsigned int (8*config_data_size) config_data
}
```

FIG. 18

```
aligned(8) class ImageQualityImprovementProperty
extends ItemFullProperty('pixi', version = 0, flags = 0){
    ImageQualityImprovementInfomation();
    ImageQualityImprovementData();
}
```

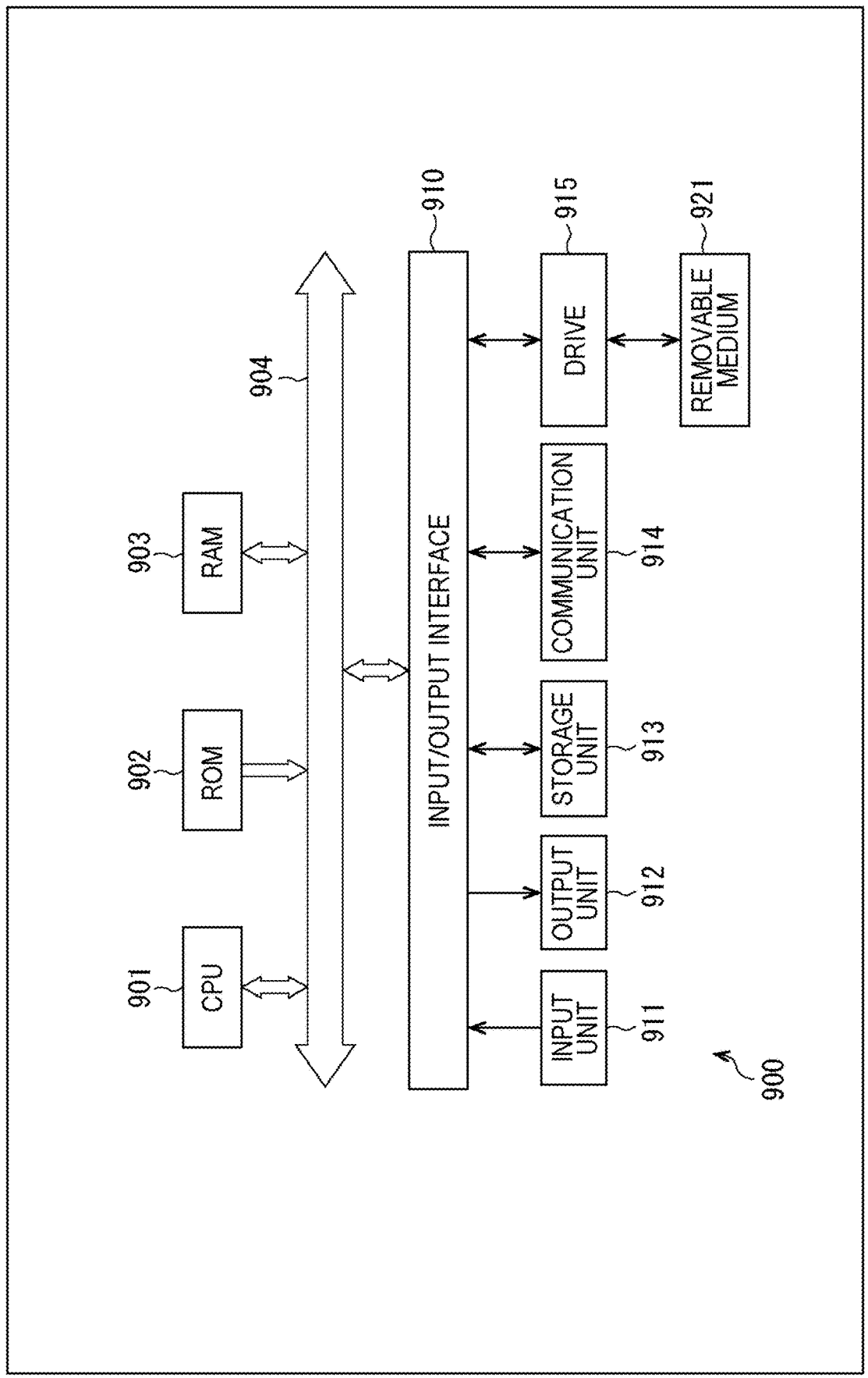

INFORMATION PROCESSING DEVICE AND METHOD THEREOF

CROSS-REFERENCE TO RELATED APPLICATIONS

The present application is based on PCT filing PCT/JP2022/017458, filed Apr. 11, 2022, which claims priority from U.S. Provisional Patent Application No. 63/174,096, filed Apr. 13, 2021, the entire contents of each are incorporated herein by reference.

TECHNICAL FIELD

The present disclosure relates to an information processing device and a method, and particularly, to an information processing device and a method, in which an image quality improvement technology required for reproducing contents can be easily used.

BACKGROUND ART

In the related art, as an image encoding method, there is versatile video coding (VVC) for deriving a prediction residual of a moving image, and performing coefficient conversion and quantization to encode the prediction residual (see, for example, Non Patent Document 1). Furthermore, as a method of storing a picture file encoded by the VCC, a VVC file format using International Organization for Standardization Base Media File Format (ISOBMFF) which is a file container specification of an international standard technology, Moving Picture Experts Group-4 (MPEG-4) for moving image compression has been under development (see, for example, Non Patent Document 2 and Non Patent Document 3). Furthermore, a method of applying Moving Picture Experts Group-Dynamic Adaptive Streaming over Hypertext Transfer Protocol (HTTP) (MPEG-DASH), and adaptively delivering contents according to a bit rate or the like is considered (for example, see Non Patent Document 4). Furthermore, as content delivery to which such a technology is applied, for example, there has been delivery of a 360-degree image (See, for example, Non Patent Document 5).

Meanwhile, a method has been proposed in which parameter data necessary for applying a super-resolution technology, which is one of the image quality improvement technologies, to a picture is stored in a VVC bitstream, and a client uses the parameter data to apply the super-resolution technology (see, for example, Non Patent Document 6). Furthermore, a method has been proposed in which a value of a processing amount necessary for application of the image quality improvement technology is stored in a VVC bitstream, and the client determines whether reproduction to which the image quality improvement technology is applied is possible on the basis of the value (see, for example, Non Patent Document 7).

CITATION LIST

Non Patent Document

Non Patent Document 1: Benjamin Bross, Jianle Chen, Shan Liu, Ye-Kui Wang, "Versatile Video Coding (Draft 10)", JVET-S2001-vH, Joint Video Experts Team (JVET) of ITU-T SG 16 WP 3 and ISO/IEC JTC 1/SC 29/WG 11 19th Meeting: by teleconference, 22 Jun.-1 Jul. 2020

Non Patent Document 2: "Information technology—Coding of audio-visual objects—Part 15: Carriage of network abstraction layer (NAL) unit structured video in the ISO base media file format—Amendment 2: Carriage of VVC and EVC in ISOBMFF", ISO/IEC JTC 1/ SC 29/WG 11, ISO/IEC 14496-15:2019(E) Amendment 2, 2020 Jul. 30

Non Patent Document 3: "Information technology—Coding of audio-visual objects—Part 12: ISO base media file format, TECHNICAL CORRIGENDUM 1", ISO/IEC JTC 1/ SC 29/WG 11, ISO/IEC 14496-12:2015/ Cor.1, 2016 Jun. 3

Non Patent Document 4: "Information technology—Dynamic adaptive streaming over HTTP (DASH)—Part 1: Media presentation description and segment formats", ISO/IEC JTC 1/ SC 29/WG 11, N18609, ISO/IEC FDIS 23009-1:201X(E), 2019 Aug. 12

Non Patent Document 5: "Information technology ? Coded representation of immersive media (MPEG-I) ? Part 2: Omnidirectional media format", ISO/IEC FDIS 23090-2: 201x (E), ISO/IEC JTC 1/ SC 29, Date: 2018 Apr. 26

Non Patent Document 6: Takeshi Chujoh, Eiich Sasaki, Tomohiro Ikai, "AHG9/ AHG11: Neural network based super resolution SEI", JVET-T0092-v2, Joint Video Experts Team (JVET) of ITU-T SG 16 WP 3 and ISO/IEC JTC 1/ SC 29 20th Meeting, by teleconference, 7-16 Oct. 2020

Non Patent Document 7: Takeshi Chujoh, Eiich Sasaki, Takuya Suzuki, Tomohiro Ikai, "AHG9/ AHG11 Level information for super-resolution neural network", JVET-U0053-v2, Joint Video Experts Team (JVET) of ITU-T SG 16 WP 3 and ISO/IEC JTC 1/ SC 29 21st Meeting, by teleconference, 6-15 Jan. 2021

SUMMARY OF THE INVENTION

Problems to be Solved by the Invention

However, in the method of the related art, the client that reproduces the content needs complicated processing such as extracting a VVC bitstream from a file and parsing the VVC bitstream in order to use the image quality improvement technology necessary for reproducing the content.

The present disclosure is achieved in view of such a situation, and an object thereof is to be capable of easily using an image quality improvement technology required for reproducing contents.

Solutions to Problems

According to an aspect of the present technology, there is provided an information processing device including: an image quality improvement technology information generation unit configured to generate image quality improvement technology information regarding an image quality improvement technology for improving an image quality of an image to be encoded; and a file generation unit configured to generate a content file storing the encoded data of the image and store the image quality improvement technology information in the content file.

According to another aspect of the present technology, there is provided an information processing method including: generating image quality improvement technology information regarding an image quality improvement technology for improving an image quality of an image to be encoded; and generating a content file storing the encoded data of the image and storing the image quality improvement technology information in the content file.

According to still another aspect of the present technology, there is provided an information processing device including: an acquisition unit configured to acquire encoded data of an image to be reproduced from a content file on the basis of image quality improvement technology information regarding an image quality improvement technology for improving an image quality of the image; and a decoding unit configured to decode the encoded data.

According to still another aspect of the present technology, there is provided an information processing method including: acquiring encoded data of an image to be reproduced from a content file on the basis of image quality improvement technology information regarding an image quality improvement technology for improving an image quality of the image; and decoding the encoded data.

In the information processing device and the method according to the aspects of the present technology, the image quality improvement technology information regarding an image quality improvement technology for improving an image quality of an image to be encoded is generated, the content file storing the encoded data of the image is generated, and the image quality improvement technology information is stored in the content file.

In the information processing device and the method according to the other aspects of the present technology, the encoded data of an image to be reproduced is acquired from the content file on the basis of image quality improvement technology information regarding an image quality improvement technology for improving an image quality of an image, and the encoded data is decoded.

BRIEF DESCRIPTION OF DRAWINGS

FIG. 1 is a diagram illustrating an example of syntax and semantics of an SEI message.

FIG. 2 is a diagram illustrating an example of syntax and semantics of an SEI message.

FIG. 3 is a diagram illustrating a correspondence table of an NNR level.

FIG. 4 is a diagram illustrating an encoding and decoding method.

FIG. 5 is a diagram illustrating an example of image quality improvement technology information.

FIG. 7 is a diagram illustrating an example of syntax regarding determination information.

FIG. 11 is a diagram illustrating an example of syntax regarding parameter data.

FIG. 12 is a diagram illustrating an example of syntax regarding parameter data.

FIG. 14 is a diagram illustrating an example of syntax regarding image quality improvement technology information.

FIG. 15 is a diagram illustrating an example of storing image quality improvement technology information in MPD.

FIG. 16 is a diagram illustrating an example of storing image quality improvement technology information in MPD.

FIG. 17 is a diagram illustrating an example of image quality improvement technology information.

FIG. 18 is a diagram illustrating an example of syntax regarding image quality improvement technology information.

FIG. 25 is a block diagram illustrating a main configuration example of a computer.

MODE FOR CARRYING OUT THE INVENTION

Figure 6:
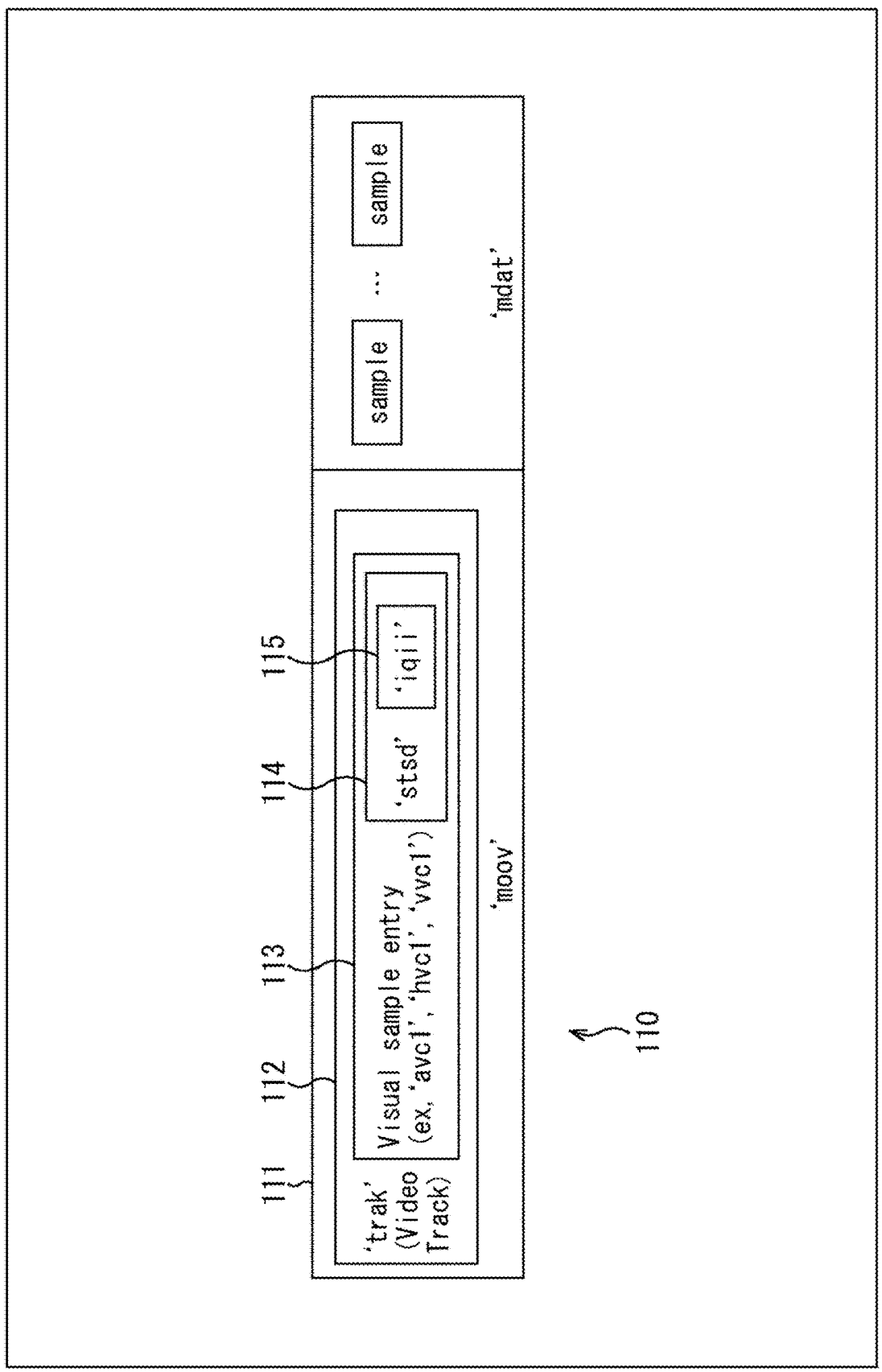
FIG. 6 is a diagram illustrating an example of storing determination information.

Hereinafter, modes for carrying out the present disclosure (hereinafter referred to as embodiments) will be described. Note that the description will be made in the following order.
1. Documents and the like supporting technical content and technical terms
2. Provision of content to which image quality improvement technology is applied
3. Provision of image quality improvement technology information
4. First embodiment (file generation device)
5. Second embodiment (client device)
6. Appendix

1. DOCUMENTS AND THE LIKE SUPPORTING TECHNICAL CONTENT AND TECHNICAL TERMS

The scope disclosed in the present technology includes not only the content described in the embodiments but also the content described in the following non Patent Documents and the like that are known at the time of filing, content of other documents referred to in the following non Patent Documents, and the like.
Non Patent Document 1: (described above)
Non Patent Document 2: (described above)
Non Patent Document 3: (described above)
Non Patent Document 4: (described above)
Non Patent Document 5: (described above)
Non Patent Document 6: (described above)
Non Patent Document 7: (described above)
Non Patent Document 8: Recommendation ITU-T H.264 (04/2017) "Advanced video coding for generic audiovisual services", April 2017
Non Patent Document 9: Recommendation ITU-T H.265 (02/18) "High efficiency video coding", February 2018

That is, the contents described in the above-described Non Patent Documents and Patent Documents are also the basis for determining the support requirements. For example, even in a case where the quad-tree block structure and the quad tree plus binary tree (QTBT) block structure described in the above-described Non Patent Documents are not directly described in the embodiments, they are within the scope of disclosure of the present technology and are assumed to satisfy the support requirements of the claims. Furthermore, for example, technical terms such as parsing, syntax, and semantics are also within the scope of disclosure of the present technology even in a case where there is no direct description in the embodiment, and meet the support requirements of the claims.

Furthermore, in the present description, a "block" (not a block indicating a processing unit) used in the description as a partial region of an image (picture) or a processing unit indicates an arbitrary partial region in the picture unless otherwise specified, and does not limit its size, shape, characteristics, and the like. For example, examples of the "block" include an arbitrary partial region (units of processing) such as a transform block (TB), a transform unit (TU), a prediction block (PB), a prediction unit (PU), a smallest coding unit (SCU), a coding unit (CU), a largest coding unit (LCU), a coding tree block (CTB), a coding tree unit (CTU), a sub-block, a macroblock, a tile, or a slice described in an above-described Non Patent Document.

Furthermore, when a size of such a block is specified, the block size may be specified not only directly but also indirectly. For example, the block size may be specified using identification information for identifying the size. Furthermore, for example, the block size may be specified by a ratio or difference with the size of the reference block (for example, LCU, SCU, or the like). For example, in a case of transmitting information for specifying the block size as a syntax element or the like, information for indirectly specifying the size as described above may be used as this information. In this manner, the information amount of the information can be reduced, and encoding efficiency may be improved. Furthermore, the specification of the block size also includes a specification of the range of the block size (for example, the specification of the range of an allowable block size, or the like).

2. PROVISION OF CONTENT TO WHICH IMAGE QUALITY IMPROVEMENT TECHNOLOGY IS APPLIED

In the related art, for example, as described in Non Patent Document 1, as an image encoding method, there is versatile video coding (VVC) for deriving a prediction residual of a moving image, and performing coefficient conversion and quantization to encode the prediction residual. Furthermore, for example, as described in Non Patent Document 2 and Non Patent Document 3, as a method of storing a picture file encoded by the VVC, a VVC file format using International Organization for Standardization Base Media File Format (ISOBMFF) which is a file container specification of an international standard technology, Moving Picture Experts Group-4 (MPEG-4) for moving image compression has been under development. Furthermore, for example, as described in Non Patent Document 4, a method of applying Moving Picture Experts Group-Dynamic Adaptive Streaming over Hypertext Transfer Protocol (HTTP) (MPEG-DASH), and adaptively delivering contents according to a bit rate or the like is considered. Furthermore, for example, as described in Non Patent Document 5, as content delivery to which such a technology is applied, for example, there has been delivery of a 360-degree image.

Meanwhile, for example, as described in Non Patent Document 6, a method has been proposed in which parameter data necessary for applying a super-resolution technology, which is one of the image quality improvement technologies, to a picture is stored in a VVC bitstream, and a client uses the parameter data to apply the super-resolution technology.

For example, as in the syntax illustrated in the upper side of FIG. 1, in a supplemental enhancement information (SEI) message, a parameter when a neural network super-resolution technology is applied to a picture is set and transmitted to a client that reproduces a content. The lower side of FIG. 1 illustrates an example of semantics of parameters used in the syntax.

Furthermore, for example, as described in Non Patent Document 7, a method has been proposed in which a value of a processing amount necessary for application of the image quality improvement technology is stored in a VVC bitstream, and the client determines whether reproduction to which the image quality improvement technology is applied is possible on the basis of the value.

For example, as in the syntax illustrated in the upper side of FIG. 2, in the SEI message, the processing amount when the neural network super-resolution technology is applied is set as an NNR level, and is transmitted to the client that reproduces the content. The lower side of FIG. 2 illustrates an example of semantics of parameters used in the syntax. FIG. 3 is a correspondence table for setting the NNR level.

The image quality improvement technology is a technology for improving the quality of a picture. For example, as the image quality improvement technology, there are noise reduction of removing noise of a picture, an edge enhancer of sharpening an outline or a boundary, and the like.

In recent years, with the development of deep learning technology, various image quality improvement technologies have been developed. For example, a super-resolution technology using deep learning has been developed. The super-resolution technology is a resolution complementary technology for generating a high-resolution picture from a low-resolution picture. Currently, in the VVC, a post filter in which the super-resolution technology is applied to a decoded picture is being studied. That is, by applying this super-resolution technology, even when the low-resolution picture is encoded and transmitted, a decoder can generate a high-resolution picture from the low-resolution picture after decoding. In other words, it can be expected that an increase in a code amount (bit rate) is suppressed as compared with a case where the high-resolution picture is encoded and transmitted. The parameter data applied to the super-resolution technology using the deep learning technology is transmitted for each content or for each picture.

However, in the method of the related art, the client that reproduces the content needs complicated processing such as extracting a VVC bitstream from a file and parsing the VVC bitstream in order to use the image quality improvement technology necessary for reproducing the content.

In other words, for example, in a case where a server delivers content files, the client has not been capable of recognizing whether or not the information regarding an image quality improvement technology is included until each of the content files is downloaded, a VVC bitstream is extracted from the content file, and the VVC bitstream is parsed.

For example, in a case where the server performs streaming delivery according to the bit rate, the client selects the bit rate of a content to be downloaded, and the server delivers a segment file of the selected bit rate. However, how much the quality of the content changes due to the application of the image quality improvement technology depends on the content and the image quality improvement technology to be applied. Therefore, in a case where the image quality improvement technology can be applied as described above, the client needs to select the segment file to be downloaded in consideration of the application of the image quality improvement technology. However, the client cannot even recognize whether or not the information regarding an image quality improvement technology is included until the downloaded data is parsed as described above. Therefore, it is difficult to select the segment file to be downloaded in consideration of the application of the image quality improvement technology.

In addition, depending on the type of image quality improvement technology, the processing amount of the client may change according to various conditions even in the same technology. However, in the method of the related art, information for determining whether or not the client can apply the image quality improvement technology is not provided to the client. Therefore, it is difficult for the client to determine whether or not the image quality improvement technology is applicable. Furthermore, there is a case where data is necessary for improving the image quality of each content, but it is difficult to provide the data to the client.

3. PROVISION OF IMAGE QUALITY IMPROVEMENT TECHNOLOGY INFORMATION

<Image Quality Improvement Technology Information>

As illustrated in the uppermost row of the table in FIG. 4, the image quality improvement technology information regarding the image quality improvement technology for improving the image quality of an image to be encoded is transmitted (#1).

For example, an information processing device (for example, a file generation device) includes: an image quality improvement technology information generation unit that generates image quality improvement technology information regarding an image quality improvement technology for improving an image quality of an image to be encoded; and a file generation unit that generates a content file storing the encoded data of the image and stores the image quality improvement technology information in the content file.

Furthermore, an information processing method (for example, a file generation method) includes: generating image quality improvement technology information regarding an image quality improvement technology for improving an image quality of an image to be encoded; and generating a content file storing the encoded data of the image and storing the image quality improvement technology information in the content file.

Furthermore, an information processing device (for example, a client device) includes: an acquisition unit that acquires encoded data of an image to be reproduced from a content file on the basis of image quality improvement technology information regarding an image quality improvement technology for improving the image quality of the image; and a decoding unit that decodes the encoded data.

Furthermore, an information processing method (for example, a reproducing method) includes: acquiring encoded data of an image to be reproduced from a content file on the basis of image quality improvement technology information regarding an image quality improvement technology for improving the image quality of the image; and decoding the encoded data.

In this case, the content file is a file storing content data. The content is arbitrary as long as the content includes an image. For example, information other than the image, such as sound, may be included. Furthermore, this image may be a moving image or a still image. An encoding method is arbitrary. A decoding method may be any method as long as it is a method corresponding to the encoding method (a method of being capable of correctly decoding the data encoded by the encoding method).

In this manner, the information processing device (for example, the client device) that reproduces the content can easily use the image quality improvement technology required for reproducing the content. Note that "easily" means that it is not necessary to parse the content data.

Thus, for example, in a delivery service, the client device can select the segment file in consideration of the application of the image quality improvement technology. Therefore, the server can provide a segment file that can be displayed with high quality at a low bit rate. That is, an increase in data transmission amount can be suppressed. In general, the cost of a contents delivery network (CDN) is charged for the amount of transmission from the CDN. Therefore, by applying the present technology as described above to suppress an increase in data transmission amount, an increase in cost can be suppressed. In addition, the server can provide a delivery service regardless of whether or not the client device can apply the image quality improvement technology.

Furthermore, the client can ensure sufficient quality with a segment file of a low bit rate by applying the image quality improvement technology. Therefore, high-quality display can be performed even in a case where a transmission band is narrowed. Furthermore, when the image quality improvement technology of the super-resolution technology can be applied, it is possible to perform high-quality display even when a segment file having a resolution lower than the resolution of the display of the client is reproduced.

Furthermore, for example, in the case of a service in which the client is charged for an amount of using the network, the increase in data transmission amount is suppressed by applying the present technology as described above, and thus it is possible to suppress an increase in the cost.

Note that the content of the image quality improvement technology information is arbitrary. For example, as illustrated in the second row from the top of the table in FIG. 4, determination information for determining whether to apply the image quality improvement technology may be transmitted as the image quality improvement technology information (#1-1).

That is, for example, the image quality improvement technology information may include determination information for determining whether to apply the image quality improvement technology.

Syntax 101 illustrated in FIG. 5 indicates an example of syntax of the determination information. In this syntax 101, "ImageQualityImprovementInformation" indicates determination information. The content of the determination information is arbitrary. For example, the type of image quality improvement technology, the processing amount, the result obtained from the image quality improvement technology, configuration information for improving the image quality, and the like may be included in the determination information.

Note that in the syntax 101, "level_idc_flag" is flag information indicating whether or not a "level_idc" field exists. In a case where this flag is true (for example, "one"), it indicates that the level_idc field exists. Conversely, in a case where this flag is false (for example, "zero"), it indicates that the level_idc field does not exist.

Furthermore, "display_size_flag" is flag information indicating whether or not a "display_width" field and a "display_height" field exist. In a case where this flag is true (for example, "one"), it indicates that the display_width field and the display_height field exist. Conversely, in a case where this flag is false (for example, "zero"), it indicates that the display_width field and the display_height field do not exist.

"type_uri" is uri indicating the type of image quality improvement technology information. For example, in the case of a super-resolution filter using a neural network studied in the VVC, "urn:mpeg:vvc:postfilter:superresolution:2021" is defined as this value.

"level_idc" indicates level information serving as a reference of processing of the image quality improvement technology indicated by "type_uri". This level information is defined for each "type_uri". Note that in a case where "level_idc" does not exist, the image quality improvement technology indicated by "type_uri" indicates that there is only one processing level. Furthermore, for example, in the case of "type_uri" in the above-described example, nnr_level_idc described in Non Patent Document 7 is stored.

"display_width" and "display_height" respectively indicate a width and a height of a display image to which the image quality improvement technology indicated by "type_uri" has been applied. Note that in a case where these parameters do not exist, it is indicated that the width and height of the display image are the same as those before the application of the image quality improvement technology.

"quality" indicates a value of the quality of the display image to which the image quality improvement technology indicated by "type_uri" has been applied.

"config_data_size" indicates the number of bytes of "config_data". Note that in a case where there is no "config_data", the value of "config_data_size" is set to "zero".

"config_data" indicates initialization data of the image quality improvement technology indicated by "type_uri". Data to be stored for each "type_uri" is determined. For example, in the case of "type_uri" described above, topology information of the neural network, and format information of the parameter data are included.

Furthermore, as illustrated in the third row from the top of the table in FIG. 4, parameter data to be applied in the processing to which the image quality improvement technology is applied may be transmitted as this image quality improvement technology information (#1-1-1).

That is, for example, the image quality improvement technology information may include parameter data applied in the processing to which the image quality improvement technology is applied.

Syntax 102 illustrated in FIG. 5 indicates an example of syntax of the parameter data. In this syntax 102, "ImageQualityImprovementData" indicates parameter data. The content of the parameter data is arbitrary. Note that this parameter data may not be necessary depending on the type of image quality improvement technology.

Note that in the syntax 102, "data_size" indicates the number of bytes of "data". "data" indicates parameter data of the image quality improvement technology indicated by "type_uri". For example, in the case of "type_uri" described above, parameter data of the neural network is included.

The information processing device (for example, the client device) that reproduces a content can determine whether to apply a specified image quality improvement technology on the basis of such image quality improvement technology information.

<Storage 1 in ISOBMFF>
<Storage 1 of Determination Information>

The image quality improvement technology information as described above may be stored in a file container and transmitted, for example, as illustrated in the fourth row from the top of the table in FIG. 4 (#1-2).

For example, in the information processing device (for example, the file generation device), the file generation unit may store the image quality improvement technology information in a file container that stores a content (encoded data of an image). Furthermore, in the information processing device (for example, the client device), the acquisition unit may acquire the encoded data of an image to be reproduced on the basis of the image quality improvement technology information stored in the file container in which the content (encoded data of the image) is stored.

A format and specification of the file container (content file) are arbitrary. For example, International Organization for Standardization Base Media File Format (ISOBMFF) may be used. Furthermore, a matroska media container may be used. Other formats also may be used.

By storing the image quality improvement technology information in the file container in this manner, the client device that reproduces the content can acquire the image quality improvement technology information without decoding the content (encoded data of the image). Therefore, the client device can easily use the image quality improvement technology required for reproducing the content.

For example, in a case where the image quality improvement technology information is stored in the ISOBMFF, as illustrated in the fifth row from the top of the table in FIG. 4, the determination information may be stored in a video track and transmitted (#1-2-1).

For example, in the information processing device (for example, the file generation device), the file generation unit may store the image quality improvement technology information in the video track in the ISOBMFF. Furthermore, in the information processing device (for example, the client device), the acquisition unit may acquire the encoded data of an image to be reproduced on the basis of the image quality improvement technology information stored in the video track. The video track is a track in which a content (encoded data of an image) is stored. That is, the image quality improvement technology information (including the determination information) regarding the image may be stored in the same track as that of the encoded data of the image.

In this case, for example, as illustrated in the sixth row from the top of the table in FIG. 4, the determination information may be stored in a Box newly defined in a SampleEntry and transmitted (#1-2-1-1).

For example, in the information processing device (for example, the file generation device), the file generation unit may store the image quality improvement technology information (including the determination information) in the Box in the SampleEntry of the video track in which the content (the encoded data of the image) is stored. Furthermore, in the information processing device (for example, the client device), the acquisition unit may acquire the encoded data of an image to be reproduced on the basis of the image quality improvement technology information (including the determination information) stored in the Box in the SampleEntry.

For example, in a case of FIG. 6, in a Video Track ('trak') 112 in a move box ('moov') 111 of a content file 110, a Visual sample entry 113 is extended, an ImageQualityImprovementInfoBox ('iqii') 115 is newly defined as a sample description box ('stsd') 114, and the image quality improvement technology information (including the determination information) is stored in the box.

In this case, as shown in syntax 121 of FIG. 7, an ImageQualityImprovementInfoBox ('iqii') is defined, and ImageQualityImprovementInformation is stored in the box. The ImageQualityImprovementInformation is determination information, and corresponds to the syntax 101 of FIG. 5. That is, various parameters defined in the syntax 101 are stored in the ImageQualityImprovementInfoBox. Then, as shown in syntax 122 of FIG. 7, a VisualSampleEntry is extended and the ImageQualityImprovementInfoBox is stored.

In this manner, the client device that reproduces a content can determine whether or not the image quality improvement technology can be applied (for example, whether or not there is a processing capability of reproducing the content by applying the image quality improvement technology, whether or not it is the image quality improvement technology that can be executed by client device itself, and the like) easily (that is, even when the content (encoded data of an image) is not parsed). Furthermore, the client device can recognize the resolution to which the image quality improvement technology has been applied by referring to the image quality improvement technology. Therefore, the client device can easily select whether or not to apply the image quality improvement technology as compared with the resolution of a display screen. For example, the client device can perform control such that the image quality improvement technology is not applied in a case where the resolution is larger than that of the display screen.

Note that in the case of this method, the client device can arbitrarily select whether or not to apply the ImageQualityImprovementInfoBox. The file generation device cannot force the client device to apply the ImageQualityImprovementInfoBox.

Note that the ImageQualityImprovementInfoBox (that is, the determination information) may be stored in a ConfigurationBox defined for each codec (encoding/decoding method). In this manner, the file generation device can control availability of the image quality improvement technology individually with respect to each codec (that is, for each codec). For example, by storing the ImageQualityImprovementInfoBox in an AVCConfigurationBox, the file generation device can apply the image quality improvement technology only to advanced video coding (AVC) (that is, control can be performed without affecting other codecs).

Furthermore, the ImageQualityImprovementInfoBox (that is, the determination information) may be stored in a user data box (udta box) in which user data is stored.

<Storage 2 of Determination Information>

Furthermore, for example, as illustrated in the seventh row from the top of the table in FIG. 4, the image quality improvement technology information (including the determination information) may be stored using a restriction scheme (#1-2-1-2).

In this case, in order to use the restriction scheme, the file generation device performs three processing as below.
1. A Restricted Scheme Information Box ('rinf') is disposed below a sample entry of a sample description box ('stsd').
2. A scheme type (scheme_type) of a Scheme type box ('schm') is set to 'iqip' to indicate that it is image quality improvement technology.
3. The ImageQualityImprovementInfoBox is stored in a scheme information box ('schi').

Figure 8:
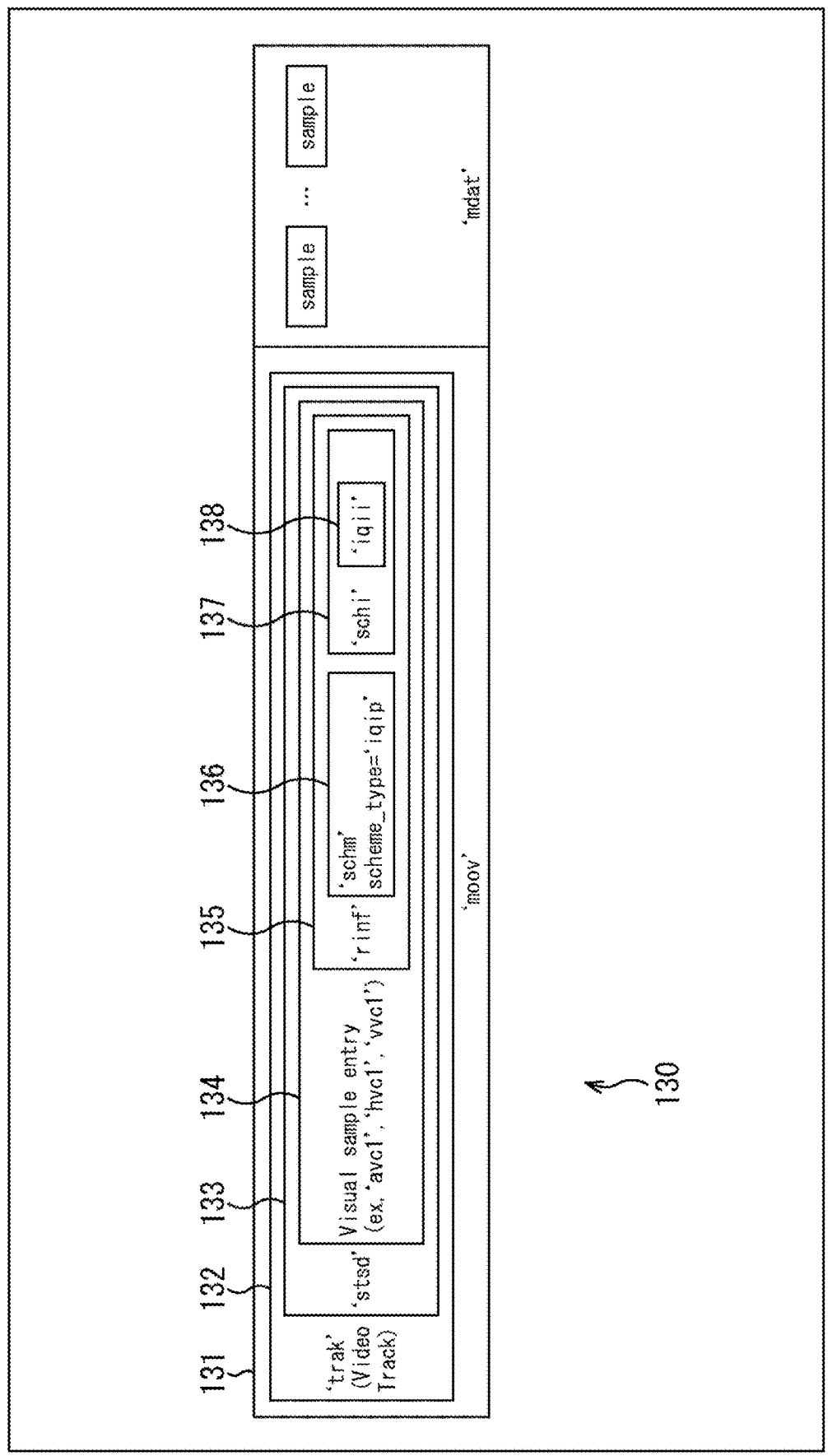
FIG. 8 is a diagram illustrating an example of storing determination information.

For example, in a case of FIG. 8, in a Video Track ('trak') 132 in a move box ('moov') 131 of a content file 130, a Restricted Scheme Information Box ('rinf') 135 is stored in a Visual sample entry 134 of a sample description box ('stsd') 133. Then, the scheme type (scheme_type) in a scheme type box ('schm') 136 is defined as 'iqip'. Then, an ImageQualityImprovementInfoBox ('iqii') 138 is stored in a schema information box ('schi') 137 in a Restricted Scheme Information Box ('rinf') 135.

In this manner, similarly to the case of <Storage 1 of determination information>, it is possible for the client device to arbitrarily select whether or not to apply the ImageQualityImprovementInfoBox.

Note that in the case of this method, the file generation device may be required to apply the image quality improvement technology. In this case, "width" and "height" of a TrackHeaderBox may be set to "width" and "height" displayed after the application of the image quality improvement technology, and a Restricted Sample Entry ('resv') is only required to be used as a sample entry.

Figure 9:
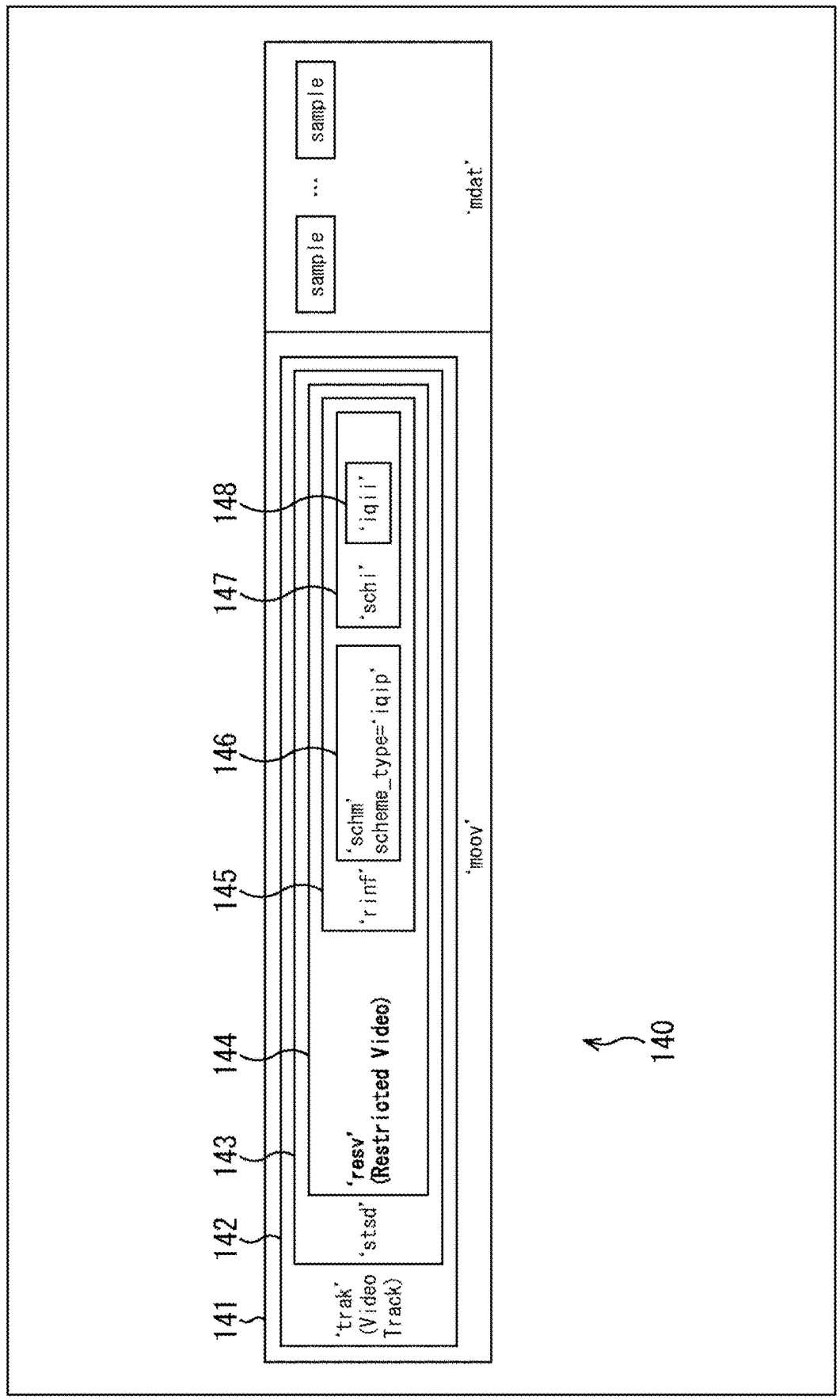
FIG. 9 is a diagram illustrating an example of storing determination information.

For example, in a case of FIG. 9, in a Video Track ('trak') 142 in a move box ('moov') 141 of a content file 140, a Restricted Sample Entry ('resv') 144 is used as a sample entry of a sample description box ('stsd') 143. Then, a Restricted Scheme Information Box ('rinf') 145 is stored in the Restricted Sample Entry ('resv') 144. Then, the scheme type (scheme_type) in a scheme type box ('schm') 146 is defined as 'iqip'. Then, an ImageQualityImprovementInfoBox ('iqii') 148 is stored in a schema information box ('schi') 147 in a Restricted Scheme Information Box ('rinf') 145. Then, although not illustrated, "width" and "height" of a TrackHeaderBox are set to "width" and "height" displayed after the application of the image quality improvement technology.

Note that in a case where the client can select application of the image quality improvement technology, "width" and "height" of the TrackHeaderBox are set to "width" and "height" in a case where the image quality improvement technology is not applied.

<Storage 1 of Parameter Data>

Furthermore, in a case where the image quality improvement technology information is stored in the ISOBMFF, for example, as illustrated in the eighth row from the top of the table in FIG. 4, parameter data may be stored in a video track and transmitted (#1-2-1-3).

Figure 10:
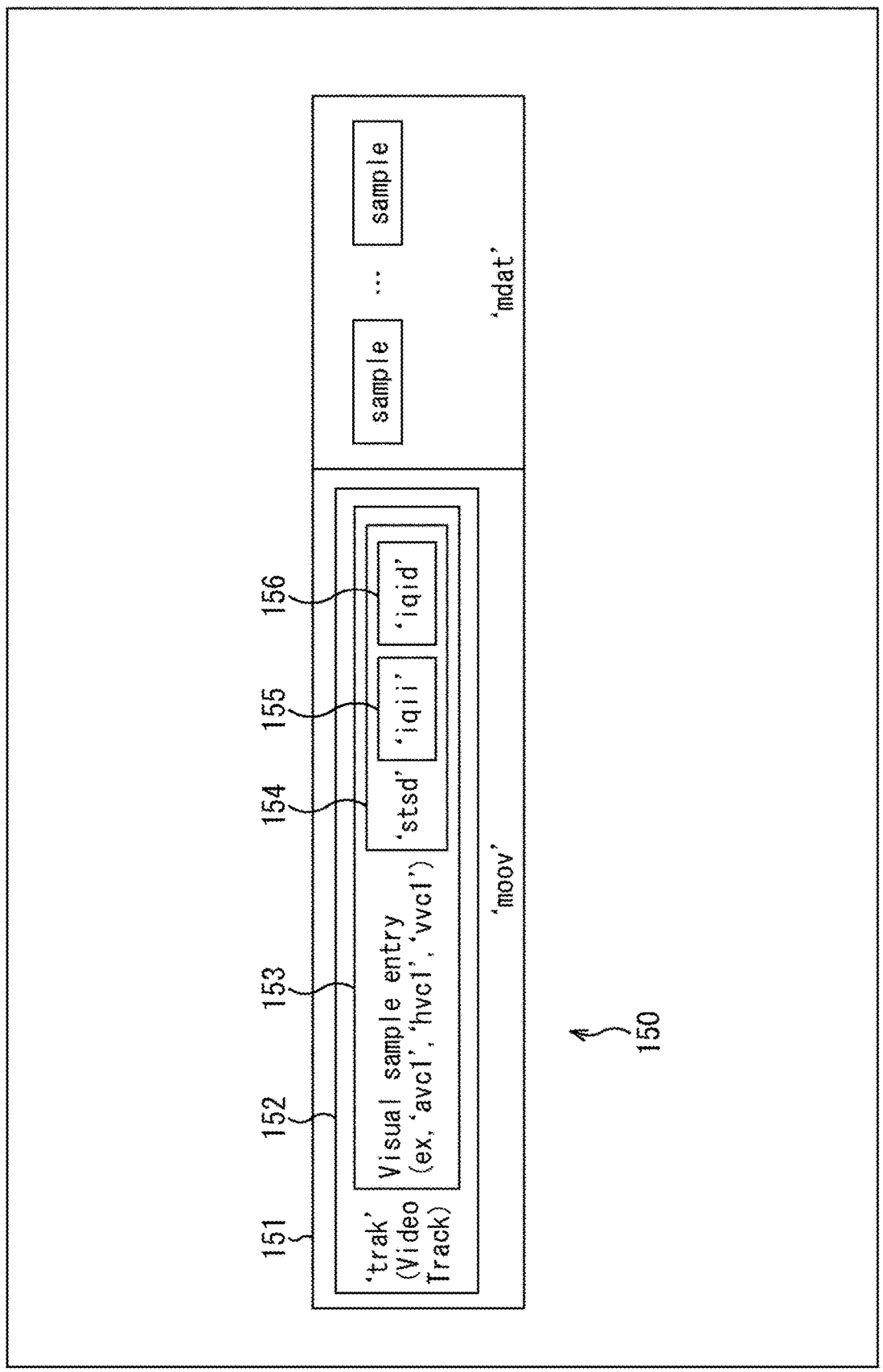
FIG. 10 is a diagram illustrating an example of storing parameter data.

For example, as illustrated in the ninth row from the top of the table in FIG. 4, the parameter data may be stored in a Box newly defined in the SampleEntry and transmitted (#1-2-1-3-1). For example, in a case of FIG. 10, in a Video Track ('trak') 152 in a move box ('moov') 151 of a content file 150, a Visual sample entry 153 is extended, and an ImageQualityImprovementInfoBox ('iqii') 155 and an ImageQualityImprovementDataBox ('iqid') 156 are newly defined as a sample description box ('stsd') 154, the determination information is stored in the ImageQualityImprovementInfoBox ('iqii') 155, and the parameter data is stored in the ImageQualityImprovementDataBox ('iqid') 156.

In this case, as shown in syntax 161 of FIG. 11, an ImageQualityImprovementDataBox ('iqid') is defined, and an ImageQualityImprovementData is stored in the box. This ImageQualityImprovementData is parameter data, and corresponds to the syntax 102 of FIG. 5. That is, various parameters defined in the syntax 102 are stored in the ImageQualityImprovementDataBox. Then, as shown in syntax 162 of FIG. 11, a VisualSampleEntry is extended and the ImageQualityImprovementDataBox is stored.

In this manner, it is possible to store parameter data necessary for applying the common image quality improvement technology in the bitstream. In addition, the parameter data can be stored in the video track together with the determination information. That is, the client device can acquire both the determination information and the parameter data by referring to a visual sample entry.

Note that similarly to the case of the determination information, the ImageQualityImprovementDataBox (that is, the parameter data) may be stored in a ConfigurationBox defined for each codec (encoding/decoding method). In this manner, the file generation device can set parameter data necessary for application of the image quality improvement technology individually with respect to each codec (that is, for each codec). For example, by storing the ImageQualityImprovementDataBox in the AVCConfigurationBox, the file generation device can set the parameter data only to advanced video coding (AVC) (that is, the parameter data can be set without affecting other codecs).

Furthermore, the ImageQualityImprovementDataBox (that is, the parameter data) may be stored in a user data box (udta box) in which user data is stored.

Furthermore, similarly to the case of the determination information, a restriction scheme may be used. In this case, in addition to the processing described above in <Storage 2 of determination information>, the ImageQualityImprovementDataBox is only required to be added to the scheme information box ('schi').

Furthermore, an ImageQualityImprovementData which is parameter data may be stored in the ImageQualityImprovementInfoBox. For example, as shown in syntax 163 of FIG. 11, an ImageQualityImprovementInformation and an ImageQualityImprovementData are stored in an ImageQualityImprovementInfoBox ('iqii').

In this manner, it is possible for the client device to acquire the determination information and the parameter data by referring to the ImageQualityImprovementInfoBox.

Note that the ImageQualityImprovementInfoBox including the determination information and the parameter data may be stored in the sample description box in the VisualSampleEntry, similarly to the case described above in <Storage 1 of determination information>. That is, the ImageQualityImprovementData (parameter data) may be stored in the ImageQualityImprovementInfoBox 115 in the example of FIG. 6 (FIG. 7). Furthermore, the ImageQualityImprovementInfoBox including the determination information and the parameter data may be stored in the ConfigurationBox similarly to the case described above in <Storage 1 of determination information>. Furthermore, the ImageQualityImprovementInfoBox including the determination information and the parameter data may be stored in the user data box (udta box) similarly to the case described above in <Storage 1 of determination information>.

Furthermore, similarly to the case described above in <Storage 2 of determination information>, the ImageQualityImprovementInfoBox including the determination information and the parameter data may be stored using a restriction scheme. That is, the ImageQualityImprovementData (parameter data) may be stored in the ImageQualityImprovementInfoBox 138 in the example of FIG. 8. Furthermore, the ImageQualityImprovementData (parameter data) may be stored in the ImageQualityImprovementInfoBox 148 in the example of FIG. 9.

<Storage 2 of Parameter Data>

Note that in a case where the applied parameter data changes (in a case where the parameter data is dynamic) in a bitstream (in a sequence), a SampleGroupEntry may be extended and the parameter data may be stored as illustrated in the tenth row from the top of the table in FIG. 4 (#1-2-1-3-2). For example, a VisualSampleGroupEntry may be extended, and an ImageQualityImprovementDataEntry, which is a sample group for storing parameter data, may be defined. For example, as shown in syntax 171 of FIG. 12, an ImageQualityImprovementDataEntry is defined, and an ImageQualityImprovementData is stored in the box. This ImageQualityImprovementData is parameter data, and corresponds to the syntax 102 of FIG. 5. That is, various parameters defined in the syntax 102 are stored in the ImageQualityImprovementDataEntry.

In this manner, it is possible to make the parameter data applied to each sample in the bitstream variable (dynamic).

In this case, as described above in <Storage 1 of determination information> and <Storage 2 of determination information>, the determination information is stored in an ImageQualityImprovementInformationBox.

Note that the determination information may also be stored using a sample group. For example, as shown in syntax 172 of FIG. 12, the VisualSampleGroupEntry is extended, an ImageQualityImprovementInfoEntry is defined, and an ImageQualityImprovementInformation and an imageQualityImprovementData are stored in the imageQualityImprovementInfoEntry. In this manner, it is possible for the client device to acquire the determination information and the parameter data by referring to the ImageQualityImprovementInfoEntry. However, also in this case, the ImageQualityImprovementInformation does not change (is static) in the bitstream. That is, each sample group entry includes the same ImageQualityImprovementInformation.

<Storage 2 in ISOBMFF>
<Storage in Metadata Track>

Furthermore, in a case where the image quality improvement technology information is stored in the ISOBMFF, as illustrated in the eleventh row from the top of the table in FIG. 4, the image quality improvement technology information is stored in a metadata track and transmitted (#1-2-2).

For example, in the information processing device (for example, the file generation device), the file generation unit may store the image quality improvement technology information in the metadata track storing metadata. Furthermore, in the information processing device (for example, the client device), the acquisition unit may acquire the encoded data of an image to be reproduced on the basis of the image quality improvement technology information stored in the metadata track. The metadata track is a track different from the video track in which a content (encoded data of an image) is stored. That is, the image quality improvement technology information (including the determination information) regarding the image may be stored in a track different from the track in which the encoded data of the image is stored.

In this case, the metadata track is extended, and an image quality improvement technology Meta track is defined. For example, a metafile 180 on the lower side of FIG. 13 is a file that stores a metadata track (that is, an image quality improvement technology Meta track) corresponding to a video track stored in a content file 190 on the upper side of FIG. 13.

In the metafile 180, in order to indicate that it is the image quality improvement technology Meta track, as shown in syntax 201 of FIG. 14, an ImageQualityImprovementMetadataSampleEntry ('iqim') deriving a MetadataSampleEntry is defined. That is, in an image quality improvement technology Meta Track ('trak') 182 in a move box ('moov') 181 of the metafile 180 in FIG. 13, an ImageQualityImprovementMetadataSampleEntry ('iqim') 185 is newly defined as a sample description box ('stsd') 184. This makes it possible to identify that this track is the image quality improvement technology Meta track.

Then, an ImageQualityImprovementInformationBox ('iqii') 186 (that is, the determination information) is stored in the ImageQualityImprovementMetadataSampleEntry ('iqim') 185.

Figure 13:
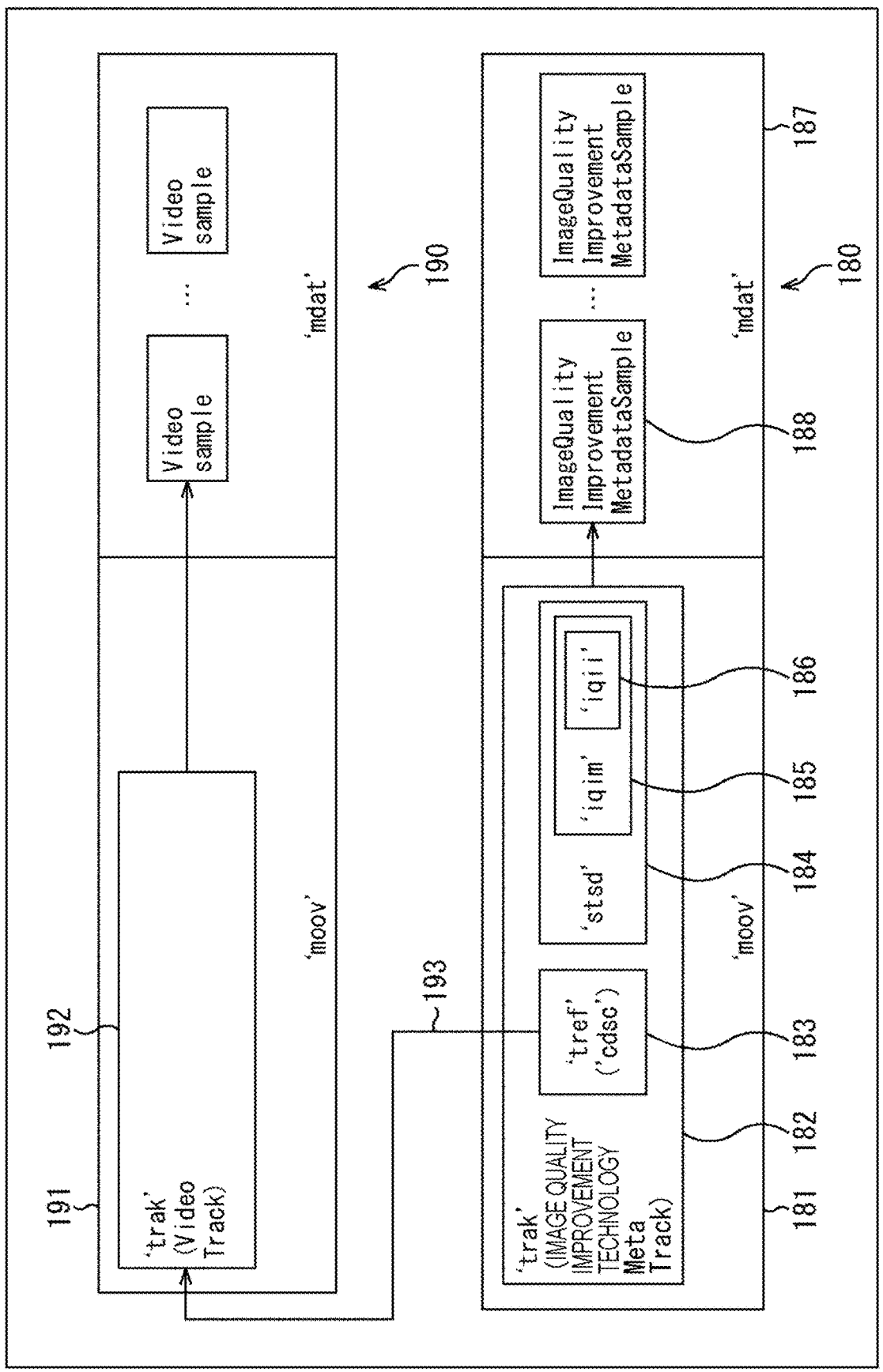
FIG. 13 is a diagram illustrating an example of storing image quality improvement technology information.

In each sample (ImageQualityImprovementMetadataSample 188 in a media data box ('mdat') 187 of FIG. 13) of the image quality improvement technology Meta track, parameter data of the image quality improvement technology is stored. That is, as shown in syntax 202 of FIG. 14, an ImageQualityImprovementMetadataSample is defined, and an ImageQualityImprovementData is stored in the box. This ImageQualityImprovementData is parameter data, and corresponds to the syntax 102 of FIG. 5. That is, various parameters defined in the syntax 102 are stored in the ImageQualityImprovementMetadataSample.

Moreover, a Video Track to which the image quality improvement technology is applied is specified using a function of a Track reference that enables reference between tracks. For example, in FIG. 13, ('cdsc') is specified as reference_type of a Track reference box ('tref') 183 in the image quality improvement technology Meta track 182. 'cdsc' means Metadata indicating detailed information of the track to be referred to. Then, in the Track reference box ('tref') 183, a Video Track ('trak') 192 of a move box ('moov') 191 of the content file 190 in which the image corresponding to image-quality-related technology information is stored is specified as a reference. That is, as indicated by an arrow 193, the image quality improvement technology Meta track and the Video Track are associated with each other.

In this manner, by storing the image quality improvement technology information in a track different from the video track, the content (encoded data of the image) and the image quality improvement technology information can be individually transmitted. Therefore, for example, transmission of unnecessary information can be suppressed by not providing the image quality improvement technology information to the client not using the image quality improvement technology. Therefore, an increase in data transmission amount can be suppressed. Furthermore, it is possible to suppress an increase in processing load related to delivery from the client device or the delivery server.

Note that a method for storing the image quality improvement technology information as described above can also be applied to a case where the image quality improvement technology information is dynamic in the bitstream.

Furthermore, unique reference_type ('iqim') may be defined as reference_type of the Track reference box ('tref') 183. In this manner, it is possible to clearly indicate that the image quality improvement technology is applied.

<Storage 1 in MPD>

Furthermore, the image quality improvement technology information may be stored in a media presentation description (MPD) and transmitted, for example, as illustrated in the twelfth row from the top of the table in FIG. 4 (#1-3). The MPD is a control file that stores information for controlling the delivery of the content file. In the MPD, for example, in the delivery of the content using a Moving Picture Experts Group phase-Dynamic Adaptive Streaming over HTTP (MPEG-DASH), the client device selects a segment file to be received on the basis of information regarding the MPD, and requests the server to deliver the segment file. The server delivers the requested segment file. In this manner, for example, adaptive delivery can be performed with the bit rate and the like. The image quality improvement technology information may be stored in such an MPD.

For example, in the information processing device (for example, the file generation device), the file generation unit may further generate a control file for controlling the delivery of a content file and store the image quality improvement technology information in the control file. Furthermore, in the information processing device (for example, the client device), the acquisition unit may acquire the content file on the basis of the image quality improvement technology information stored in the control file, and acquire encoded data of the image to be reproduced from the acquired content file.

The format and specification of the control file are arbitrary. Hereinafter, a case of storage in the MPD used in the MPEG-DASH will be described. In a case where the image quality improvement technology information is stored in the MPD, for example, as illustrated in the thirteenth row from the top of the table in FIG. 4, the image quality improvement technology information may be stored in a Representation (#1-3-1). Furthermore, in this case, as illustrated in the fourteenth row from the top of the table in FIG. 4, the image quality improvement technology information may be stored in SupplementalProperty (#1-3-1-1).

FIG. 15 is a diagram illustrating a description example of the MPD in which the image quality improvement technology information is stored. In the case of the description example in FIG. 15, ImageQualityImprovementInfomation (determination information) is defined using @schemeIdUri of SupplementalProperty of Representation. Furthermore, as the parameters, @iqi:type_uri, @iqi:level, @iqi:display_width, @iqi:display_height, and @iqi:quality are defined, and the respective values are set. These parameters match the identically named fields of the syntax 101 of FIG. 5 and have the equivalent meanings.

This Representation is Representation of the Video track including the image quality improvement technology information. Therefore, a file (in a case of the example of FIG. 15, Video.mp4) that stores the Video track is specified by a BaseURL.

Note that also in this case, the image quality improvement technology information is stored in the content file (ISOBMFF or the like) similarly to the case described above in <Storage 1 in ISOBMFF>. The client device refers to the image quality improvement technology information stored in the MPD, and confirms whether the image quality improvement technical information can be handled. Then, the client device compares the representation with another representation with reference to values of iqi:display_width, iqi:display_height, and iqi:quality, and determines Representation to be acquired. Then, the client device requests the server to deliver the segment file corresponding to the selected Representation. The server delivers the requested segment file. The client device acquires the delivered segment file, and extracts and decodes a bitstream. Then, a display image is generated by appropriately applying an image quality improvement technology to the obtained image, and the generated display image is displayed.

In this manner, the information processing device (for example, the client device) that reproduces the content can easily use the image quality improvement technology required for reproducing the content without decoding the bitstream (encoded data of the image). Therefore, the client device can select (request the server to select) the content file to be adaptively delivered with the bit rate or the like in consideration of the application of the image quality improvement technology.

Therefore, the server can provide a segment file that can be displayed with high quality at a low bit rate, for example, in a case where the client device can apply the image quality improvement technology. That is, an increase in data transmission amount can be suppressed. In general, the cost of a contents delivery network (CDN) is charged for the amount of transmission from the CDN. Therefore, by applying the present technology as described above to suppress an increase in data transmission amount, an increase in cost can be suppressed. In addition, the server can provide a delivery service regardless of whether or not the client device can apply the image quality improvement technology. In other words, the server can adaptively deliver the content in consideration of the application of the image quality improvement technology.

On the other hand, the client device can ensure sufficient quality with a segment file of a low bit rate by applying the image quality improvement technology. Therefore, high-quality display can be performed even in a case where a transmission band is narrowed. Furthermore, when the image quality improvement technology of the super-resolution technology can be applied, it is possible to perform high-quality display even when a segment file having a resolution lower than the resolution of the display of the client is reproduced.

Furthermore, for example, in the case of a service in which the client is charged for an amount of using the network, the increase in data transmission amount is suppressed by applying the present technology as described above, and thus it is possible to suppress an increase in the cost.

Note that a value of a parameter "iqi:quality" may be indicated not by a numerical value but by a bit rate assumed in a case where encoding is performed so as to obtain the same resolution and image quality without using the image quality improvement technology.

Furthermore, config_data included in the ImageQualityImprovementInfomation may be included. Furthermore, @codec may be added. In the Video track including the image quality improvement technology information, in a track in which the restricted scheme is used, @codec starts with "resv". By confirming @codecs, it is possible to determine whether it is Representation to which the image quality improvement technology is to be necessarily applied. Furthermore, the image quality improvement technology information may be stored in EssentialProperty instead of the SupplementalProperty.

<Storage 2 in MPD>

Note that in the content file (for example, ISOBMFF), the image quality improvement technology information may be stored in a metadata track (image quality improvement technology Meta track) different from the video track in which the content (encoded data of the image) is stored.

In this case, in the MPD, the image quality improvement technology information is stored in a Representation of the image quality improvement technology Meta track. Therefore, in the BaseURL, a file (for example, SuperResolutionMetadata.mp4 in FIG. 16) for storing the image quality improvement technology Meta track is specified.

Furthermore, in this case, a file of the image quality improvement technology Meta track and the Representation of a Video to which the file is applied are respectively stored in different AdaptationSets. Therefore, for example, as illustrated in the fifteenth row from the top of the table in FIG. 4, in order to specify the Representation of the Video to which the file of the image quality improvement technology Meta track is applied, the Representation of the file of the image quality improvement technology Meta track may be associated to a Representation of a Video bitstream file to be applied (#1-3-1-2). For example, this association may be performed using Representation@associationId.

FIG. 16 is a diagram illustrating a description example of the MPD in which the image quality improvement technology information is stored. In a case of a description example of FIG. 16, an ID of a Representation of a Video Track (Representation id="101") is set to associationId of the Representation of the image quality improvement technology Meta track (associationId="101"). Therefore, the client device can specify the Representation of the Video Track to be referred to on the basis of the value of associationId as indicated by a dotted arrow 221.

In this manner, the image quality improvement technology Meta track and the Video track can be stored in different files. Therefore, the client device that does not apply the image quality improvement technology may not acquire the image quality improvement technology Meta track, and thus the amount of transmission can be reduced.

Note that in the Representation of the image quality improvement technology Meta track, @width may be set to the same value as iqi:display width. Similarly, @height may be set to the same value as iqi:display_height. Furthermore, similarly to the image quality improvement technology Meta track, a file of another format of metadata for performing the image quality improvement technology may be indicated by the BaseURL of the Representation.

<Image Quality Improvement Technology Information for Each Region>

Note that in the case of the ISOBMFF, for example, the inside of a picture can be divided into regions by using a Tile region group entry described in Non Patent Document 2. Furthermore, in a region-wise packing box described in Non Patent Document 5, there is a method of dividing a projected picture into regions, packing the regions, storing the regions as a packed picture, and transmitting the packed picture.

As described above, in a case where a picture is divided into partial regions and each of the partial regions is encoded independently of each other, there is a possibility that the image quality improvement technology is applied for each region. Therefore, for example, as illustrated in the sixteenth row from the top of the table in FIG. 4, the image quality improvement technology information for each region may be transmitted (#1-4).

In other words, the image quality improvement technology information stored in the content file (and the MPD) may include information regarding each region (information regarding each partial region of the image).

FIG. 17 is a diagram illustrating an example of syntax of ImageQualityImprovementInformation in this case. In the syntax of FIG. 17, parameters indicated in bold are information (parameters) for each region.

For example, "target_region_type" is a parameter that specifies the region to be processed. For example, in a case where a value of this parameter is "one", a "Tile region group entry" may be indicated. Furthermore, in a case where a value of this parameter is "two", "region_wise_packing" may be indicated.

Furthermore, "target_region_num" is a parameter indicating the number of regions to which the image quality improvement technology is applied.

Furthermore, "target_region_id" is a parameter indicating a region to which the image quality improvement technology is applied. For example, in a case of target_region_type=1, "target_region_id" may be indicated by a groupID. Furthermore, in a case of target_region_type=2, "target_region_id" may be indicated by a number of a region.

Association with Still Image Data

In the ISOBMFF, still image data can be stored in a MetaBox. In this case, the image quality improvement technology information may be capable of being applied to the still image data. For example, as illustrated in the bottom row of the table in FIG. 4, the image quality improvement technology information of the still image data may be transmitted (#1-5).

For example, in the information processing device (for example, the file generation device), the file generation unit may associate the image quality improvement technology information with still image data stored in the content file. Furthermore, in the information processing device (for example, the client device), the acquisition unit may acquire the still image data associated with the image quality improvement technology information.

For example, as in syntax illustrated in FIG. 18, ItemFullProperty may be extended and ImageQualityImprovementProperty may be defined. Then, the ImageQualityImprovementInfomation and the ImageQualityImprovementData may be stored in the Property. The ImageQualityImprovementInformation is determination information, and corresponds to the syntax 101 of FIG. 5. Furthermore, the ImageQualityImprovementData is parameter data, and corresponds to the syntax 102 of FIG. 5. That is, various parameters defined in the syntax 101 and the syntax 102 are stored in the ImageQualityImprovementProperty.

This data is only required to be associated as the Property of the still image data. In a case where the image quality improvement technology information is applied, an essential field of an ItemPropertyAssociationBox for associating an ItemProperty is only required to be set to "one".

4. FIRST EMBODIMENT

<File Generation Device>

Figure 19:
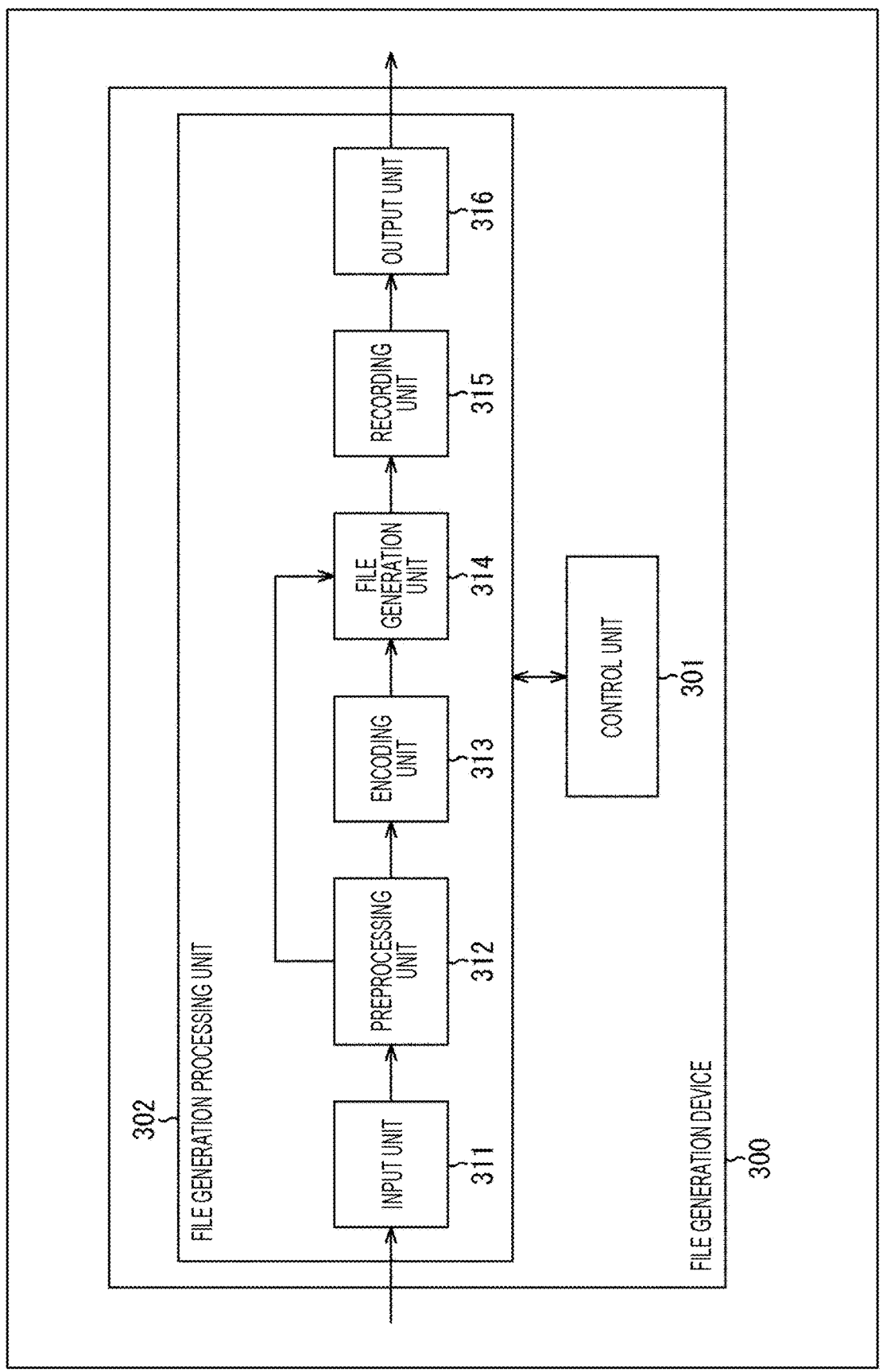
FIG. 19 is a block diagram illustrating a main configuration example of a file generation device.

(Each method of) the present technology described above can be applied to an arbitrary device. FIG. 19 is a block diagram illustrating an example of a configuration of the file generation device that is an aspect of the information processing device to which the present technology is applied. A file generation device 300 illustrated in FIG. 19 is a device that encodes a moving image content by VVC and stores the encoded moving image content in the ISOBMFF.

Note that FIG. 19 illustrates a main configuration including processing units and data flows, and the processing units and data flows illustrated in FIG. 19 are not limited. That is, in the file generation device 300, there may be a processing unit not illustrated as a block in FIG. 19, or there may be processing or a data flow not illustrated by an arrow or the like in FIG. 19.

As illustrated in FIG. 19, the file generation device 300 includes a control unit 301 and a file generation processing unit 302. The control unit 301 controls the file generation processing unit 302. The file generation processing unit 302 is controlled by the control unit 301 and performs processing related to file generation. For example, the file generation processing unit 302 acquires data of a content having a subpicture in a picture, encodes the data, and generates a VVC bitstream. Moreover, the file generation processing unit 302 stores the generated VVC bitstream in the file of the ISOBMFF, and outputs the file to the outside of the file generation device 300.

The file generation processing unit 302 includes an input unit 311, a preprocessing unit 312, an encoding unit 313, a file generation unit 314, a recording unit 315, and an output unit 316.

The input unit 311 acquires data of a content including an image and supplies the data to the preprocessing unit 312. The preprocessing unit 312 extracts information necessary for file generation from the data of the content. The preprocessing unit 312 supplies the extracted information to the file generation unit 314. Furthermore, the preprocessing unit 312 supplies the data of the content to the encoding unit 313.

The encoding unit 313 encodes the data of the content supplied from the preprocessing unit 312 by a VVC method, and generates a VVC bitstream. The encoding unit 313 supplies the generated VVC bitstream to the file generation unit 314.

Furthermore, the file generation unit 314 generates a content file of the ISOBMFF and stores the VVC bitstream supplied from the encoding unit 313 in the content file. At that time, the file generation unit 314 may appropriately store information supplied from the preprocessing unit 312 in the content file. Furthermore, the file generation unit 314 may generate an MPD corresponding to the content file.

The file generation unit 314 supplies the generated content file or MPD to the recording unit 315. For example, the recording unit 315 includes an arbitrary recording medium such as a hard disk or a semiconductor memory, and records the content file or MPD supplied from the file generation unit 314 in the recording medium. Furthermore, the recording unit 315 reads the content file or MPD recorded in the recording medium in accordance with a request from the control unit 301 or the output unit 316 or at a predetermined timing, and supplies the content file or the MPD to the output unit 316.

The output unit 316 acquires the content file or MPD supplied from the recording unit 315, and outputs the content file or the MPD to the outside of the file generation device 300 (for example, a delivery server, a reproduction device, or the like).

In the file generation device 300 having the above-described configuration, the present technology described above may be applied in <3. Provision of image quality improvement technology information>.

For example, the preprocessing unit 312 may generate image quality improvement technology information regarding an image quality improvement technology for improving the image quality of an image to be encoded. That is, the preprocessing unit 312 can also be referred to as an image quality improvement technology information generation unit. Furthermore, the file generation unit 314 may generate a content file that stores the encoded data of the image, and store the image quality improvement technology information in the content file.

Note that the image quality improvement technology information may include determination information for determining whether to apply the image quality improvement technology. Furthermore, the image quality improvement technology information may include parameter data applied in the processing to which the image quality improvement technology is applied. Furthermore, the image quality improvement technology information may include information regarding each partial region of the image.

Furthermore, the file generation unit 314 may store the image quality improvement technology information in a video track that stores an image. In this case, the file generation unit may store the image quality improvement technology information in a box in the sample entry.

Furthermore, the file generation unit 314 may store the image quality improvement technology information in a metadata track that stores metadata.

Furthermore, the file generation unit 314 may further generate a control file (MPD) for controlling the delivery of a content file and store the image quality improvement technology information in the control file.

Furthermore, the file generation unit may associate the image quality improvement technology information with still image data stored in the content file.

Other present technologies described above may be applied in <3. Provision of image quality improvement technology information>. Furthermore, a plurality of the present technologies may be appropriately combined and applied.

Since the file generation device 300 has the above-described configuration, the client device that reproduces a content can easily use the image quality improvement technology required for reproducing the content.

<Flow of File Generation Processing>

Figure 20:
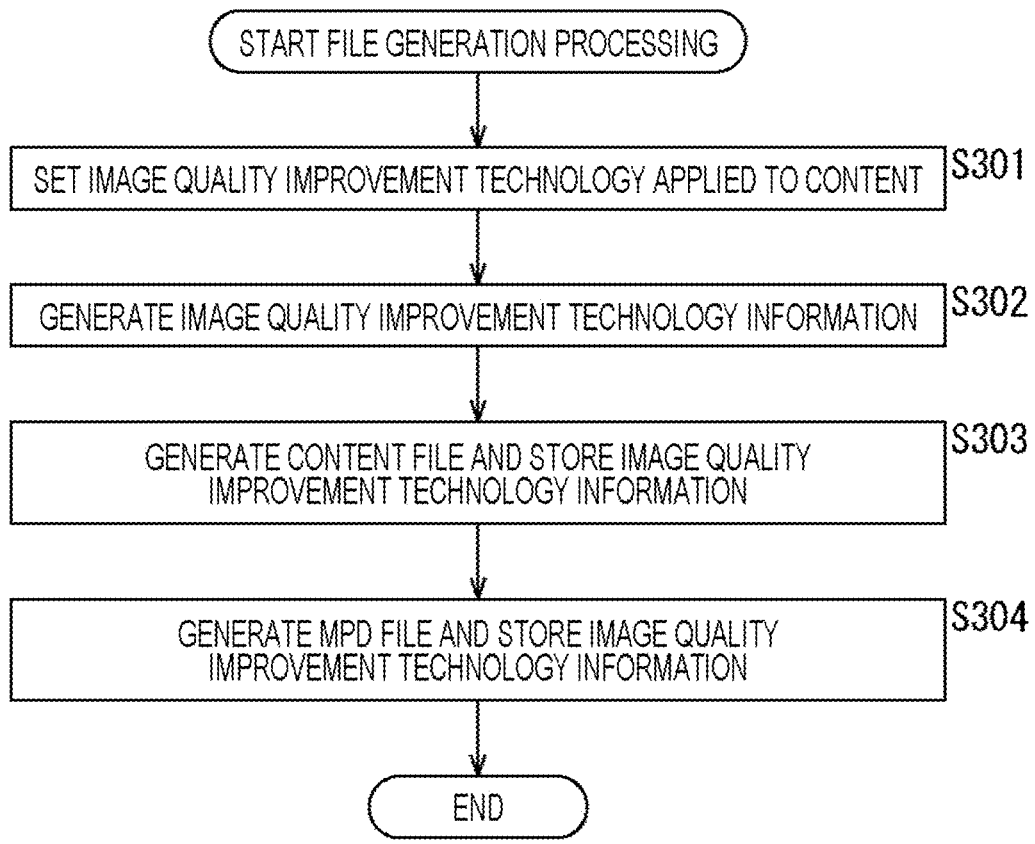
FIG. 20 is a flowchart illustrating an example of a flow of file generation processing.

An example of a flow of file generation processing executed by the file generation unit 314 in FIG. 19 will be described with reference to a flowchart of FIG. 20.

When the file generation processing is started, in step S301, the preprocessing unit 312 of the file generation device 300 acquires image data via the input unit 311, and sets an image quality improvement technology to be applied to a content on the basis of the image data.

Furthermore, in step S302, the preprocessing unit 312 generates image quality improvement technology information regarding an image quality improvement technology for improving the image quality of an image to be encoded. The encoding unit 313 encodes the image data, and generates the encoded data.

In step S303, the file generation unit 314 generates a content file that stores the encoded data of the image generated in step S302. Then, the file generation unit 314 stores the image quality improvement technology information in the content file.

In step S304, the file generation unit 314 generates an MPD. Then, the file generation unit 314 stores the image quality improvement technology information in the MPD. The recording unit 315 records the content file and MPD generated as described above. The output unit 316 reads the content file and the MPD at a predetermined timing, and outputs the content file and the MPD to the outside of the file generation device 300.

When the processing of step S304 ends, the file generation processing ends.

As described above, in the file generation processing, the present technology described above may be applied in <3. Provision of image quality improvement technology information>.

Note that the image quality improvement technology information may include determination information for determining whether to apply the image quality improvement technology. Furthermore, the image quality improvement technology information may include parameter data applied in the processing to which the image quality improvement technology is applied. Furthermore, the image quality improvement technology information may include information regarding each partial region of the image.

Furthermore, in step S303, the file generation unit 314 may store the image quality improvement technology information in a video track that stores an image. In this case, the file generation unit may store the image quality improvement technology information in a box in the sample entry.

Furthermore, in step S303, the file generation unit 314 may store the image quality improvement technology information in a metadata track that stores metadata.

Furthermore, in step S304, the file generation unit 314 may generate the MPD (control file for controlling the delivery of the content file) as described above, and store the image quality improvement technology information in the MPD.

Furthermore, in step S303, the file generation unit may associate the image quality improvement technology information with still image data stored in the content file.

Other present technologies described above may be applied in <3. Provision of image quality improvement technology information>. Furthermore, a plurality of the present technologies may be appropriately combined and applied.

Since the file generation processing is executed as described above, the client device that reproduces a content can easily use the image quality improvement technology required for reproducing the content.

Note that the file generation unit 314 may not generate the MPD. In that case, the processing of step S304 is omitted. Then, in step S303, the recording unit 315 stores the content file, and the output unit 316 reads the content file at a predetermined timing, and outputs the content file to the outside of the file generation device 300.

5. SECOND EMBODIMENT

Client Device

Figure 21:
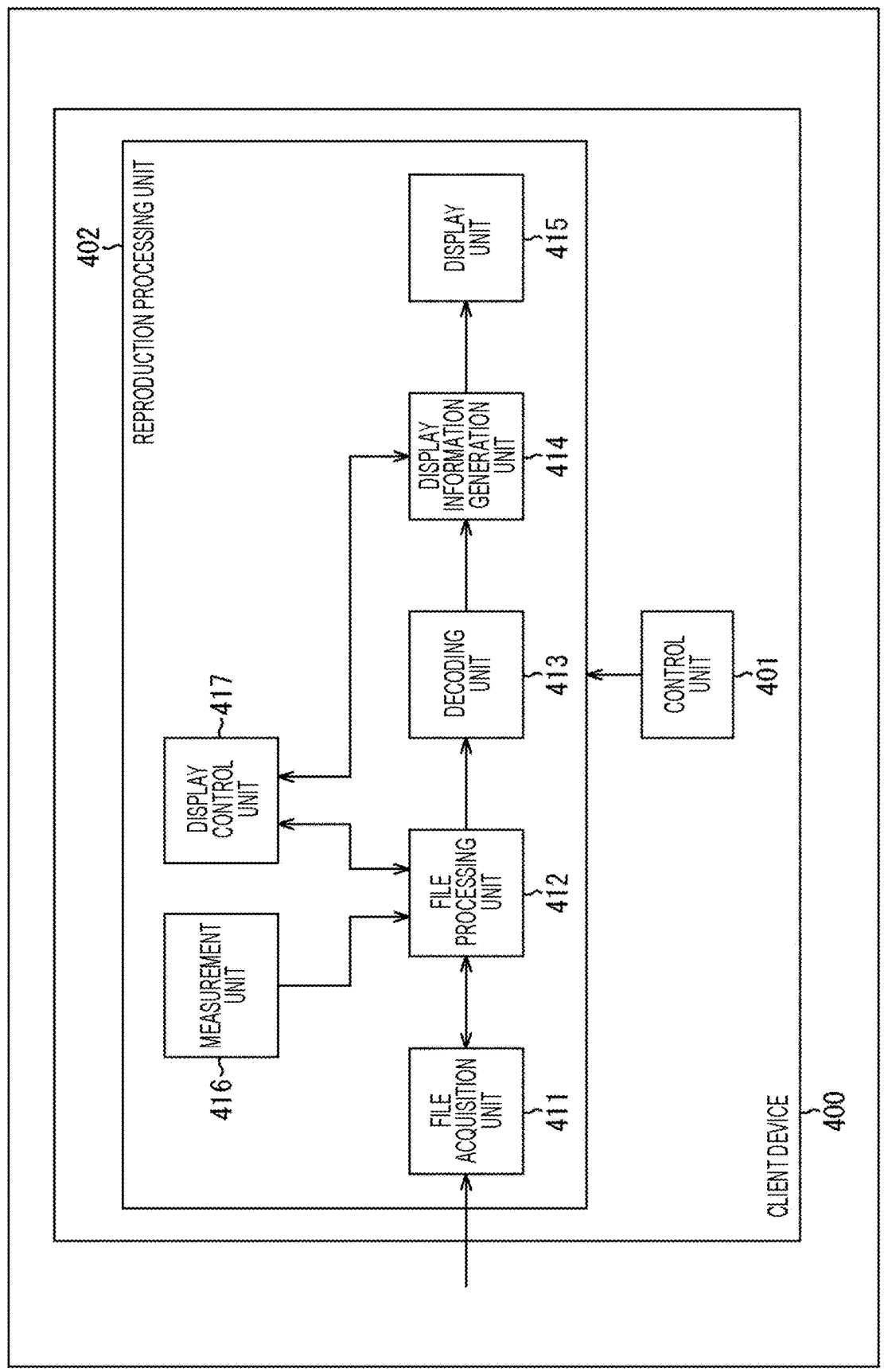
FIG. 21 is a block diagram illustrating a main configuration example of a client device.

FIG. 21 is a block diagram illustrating an example of a configuration of the client device that is an aspect of the information processing device to which the present technology is applied. A client device 400 illustrated in FIG. 21 is a reproduction device that decodes the VVC bitstream in a VVC file format stored in the content file of the ISOBMFF, and generates and displays a display image of the generated moving image content.

Note that FIG. 21 illustrates main elements such as processing units and data flows, but those illustrated in FIG. 21 do not necessarily include all elements. That is, in the client device 400, there may be a processing unit not illustrated as a block in FIG. 21, or there may be processing or a data flow not illustrated as an arrow or the like in FIG. 21.

As illustrated in FIG. 21, the client device 400 includes a control unit 401 and a reproduction processing unit 402. The control unit 401 performs processing related to control for the reproduction processing unit 402. The reproduction processing unit 402 performs processing related to reproduction of the moving image content stored in the content file. For example, the reproduction processing unit 402 is controlled by the control unit 401 and acquires a content file from another device (for example, the file generation device 300, a server, or the like). This content file is a file container of ISOBMFF and stores the content (encoded data of an image).

The reproduction processing unit 402 executes reproduction processing on the acquired content file, decodes a bitstream of the moving image content stored in the content file, and generates and displays a display image of the moving image content.

The reproduction processing unit 402 includes a file acquisition unit 411, a file processing unit 412, a decoding unit 413, a display information generation unit 414, a display unit 415, a measurement unit 416, and a display control unit 417.

The file acquisition unit 411 acquires a content file supplied from the outside of the client device 400 (for example, the server, the file generation device 300, or the like). The file acquisition unit 411 supplies the acquired content file to the file processing unit 412.

The file processing unit 412 acquires the content file supplied from the file acquisition unit 411. The file processing unit 412 acquires a measurement result supplied from the measurement unit 416. The file processing unit 412 acquires control information supplied from the display control unit 417.

The file processing unit 412 extracts the encoded data of the image from the content file by using these pieces of information. The file processing unit 412 supplies the extracted encoded data (bitstream) to the decoding unit 413. The decoding unit 413 decodes the encoded data (bitstream), and generates (restore) the image data. The decoding unit 413 supplies the generated image data (data of the moving image content) to the display information generation unit 414.

The display information generation unit 414 acquires data of the moving image content supplied from the decoding unit 413. Furthermore, the display information generation unit 414 acquires control information supplied from the display control unit 417. Then, the display information generation unit 414 generates a display image or the like from the acquired data of the moving image content according to the control information. The display information generation unit 414 supplies the generated display image or the like to the display unit 415. The display unit 415 includes a display device, and displays the supplied display image by using the display device. The measurement unit 416 measures arbitrary information and supplies a measurement result to the file processing unit 412. The display control unit 417 controls display by supplying the control information to the file processing unit 412 and the display information generation unit 414.

In the client device 400 having the above-described configuration, the present technology described above may be applied in <3. Provision of image quality improvement technology information>.

For example, the file processing unit 412 may acquire encoded data of an image to be reproduced from the content file on the basis of image quality improvement technology information regarding an image quality improvement technology for improving the image quality of the image. That is, the file processing unit 412 can also be said to be an acquisition unit. Furthermore, the decoding unit 413 may decode the encoded data.

Note that the image quality improvement technology information may include determination information for determining whether to apply the image quality improvement technology. Furthermore, the image quality improvement technology information may include parameter data applied in the processing to which the image quality improvement technology is applied. Furthermore, the image quality improvement technology information may include information regarding each partial region of the image.

Furthermore, the file processing unit 412 may acquire the encoded data of an image to be reproduced on the basis of the image quality improvement technology information stored in the video track in which the image is stored. In this case, the file processing unit 412 may acquire the encoded data of an image to be reproduced on the basis of the image quality improvement technology information stored in the box in the sample entry.

Furthermore, the file processing unit 412 may store the image quality improvement technology information in a metadata track that stores metadata.

Furthermore, the file processing unit 412 may acquire still image data associated with the image quality improvement technology information.

Other present technologies described above may be applied in <3. Provision of image quality improvement technology information>. Furthermore, a plurality of the present technologies may be appropriately combined and applied.

Since the client device 400 has the above-described configuration, the image quality improvement technology required for reproducing the content can be easily used.

<Flow 1 of Reproduction Processing>

An example of a flow of reproduction processing executed by the client device 400 will be described with reference to a flowchart of FIG. 22.

When the reproduction processing is started, the file processing unit 412 of the client device 400 acquires the content file via the file acquisition unit 411 in step S401.

In step S402, the file processing unit 412 selects a track in which the content file acquired in step S401 can be reproduced on the basis of the image quality improvement technology information.

In step S403, the file processing unit 412 selects a track to be reproduced from among the tracks that are selected in step S402 and can be reproduced, on the basis of other information.

In step S404, the file processing unit 412 acquires a bitstream of the track selected in step S403 from the content file. That is, the file processing unit 412 acquires encoded data of an image to be reproduced from the content file on the basis of the image quality improvement technology information regarding an image quality improvement technology for improving the image quality of the image.

In step S405, the decoding unit 413 decodes the bitstream acquired in step S404, and generates (restores) the image data.

In step S406, the display information generation unit 414 executes processing (also referred to as image quality improvement technology processing) of applying the image quality improvement technology to the image data restored in step S405 on the basis of the image quality improvement technology.

In step S407, the display information generation unit 414 generates a display image. Then, the display information generation unit 414 supplies the display image to the display unit 415 and displays the display image. When the processing in step S407 ends, the reproduction processing ends.

As described above, in the reproduction processing, the present technology described above may be applied in <3. Provision of image quality improvement technology information>.

Note that the image quality improvement technology information may include determination information for determining whether to apply the image quality improvement technology. Furthermore, the image quality improvement technology information may include parameter data applied in the processing to which the image quality improvement technology is applied. Furthermore, the image quality improvement technology information may include information regarding each partial region of the image.

Furthermore, in step S401, the file processing unit 412 may acquire the encoded data of an image to be reproduced on the basis of the image quality improvement technology information stored in the video track in which the image is stored. In this case, the file processing unit 412 may acquire the encoded data of an image to be reproduced on the basis of the image quality improvement technology information stored in the box in the sample entry.

Furthermore, in step S401, the file processing unit 412 may store the image quality improvement technology information in a metadata track that stores metadata.

Furthermore, in step S401, the file processing unit 412 may acquire still image data associated with the image quality improvement technology information.

Other present technologies described above may be applied in <3. Provision of image quality improvement technology information>. Furthermore, a plurality of the present technologies may be appropriately combined and applied.

As described above, by executing each processing, the client device 400 can easily use the image quality improvement technology required for reproducing the content.

<Application to Delivery System>

Figure 22:
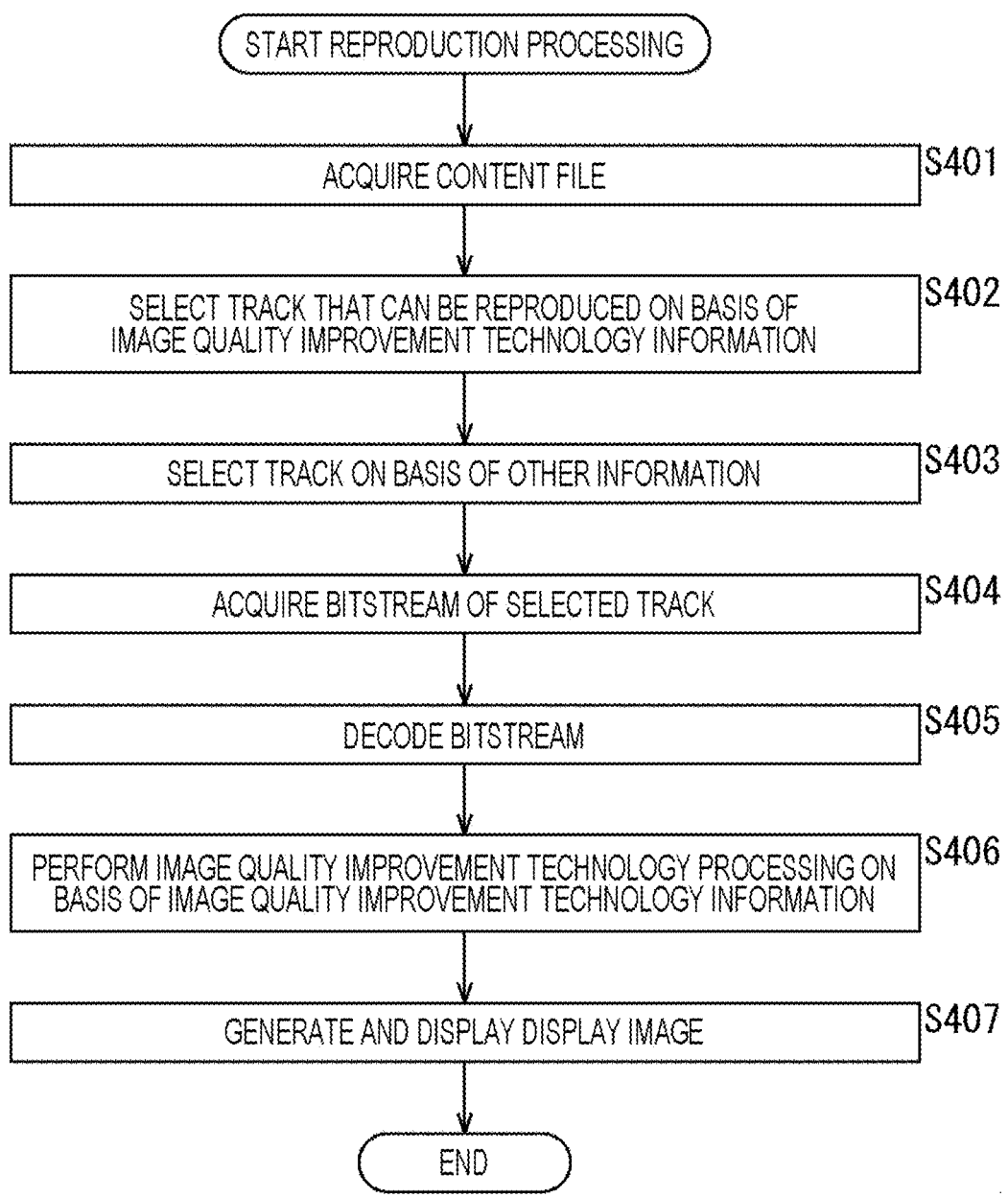
FIG. 22 is a flowchart illustrating an example of a flow of reproduction processing.

Furthermore, in FIG. 21 and FIG. 22, an example has been described in which the present technology is applied in a case where the client device 400 selects and acquires the content (encoded data of the image) from the received content file. That is, it has been described that the client device 400 selects the content (encoded data of the image) on the basis of the image quality improvement technology information included in the content file in consideration of application of the image quality improvement technology.

However, as described above, in <3. Provision of image quality improvement technology information>, the image quality improvement technology information may be stored in the control file (MPD). That is, the present technology can also be applied to a system that adaptively delivers a content file by using a control file (MPD).

Figure 23:
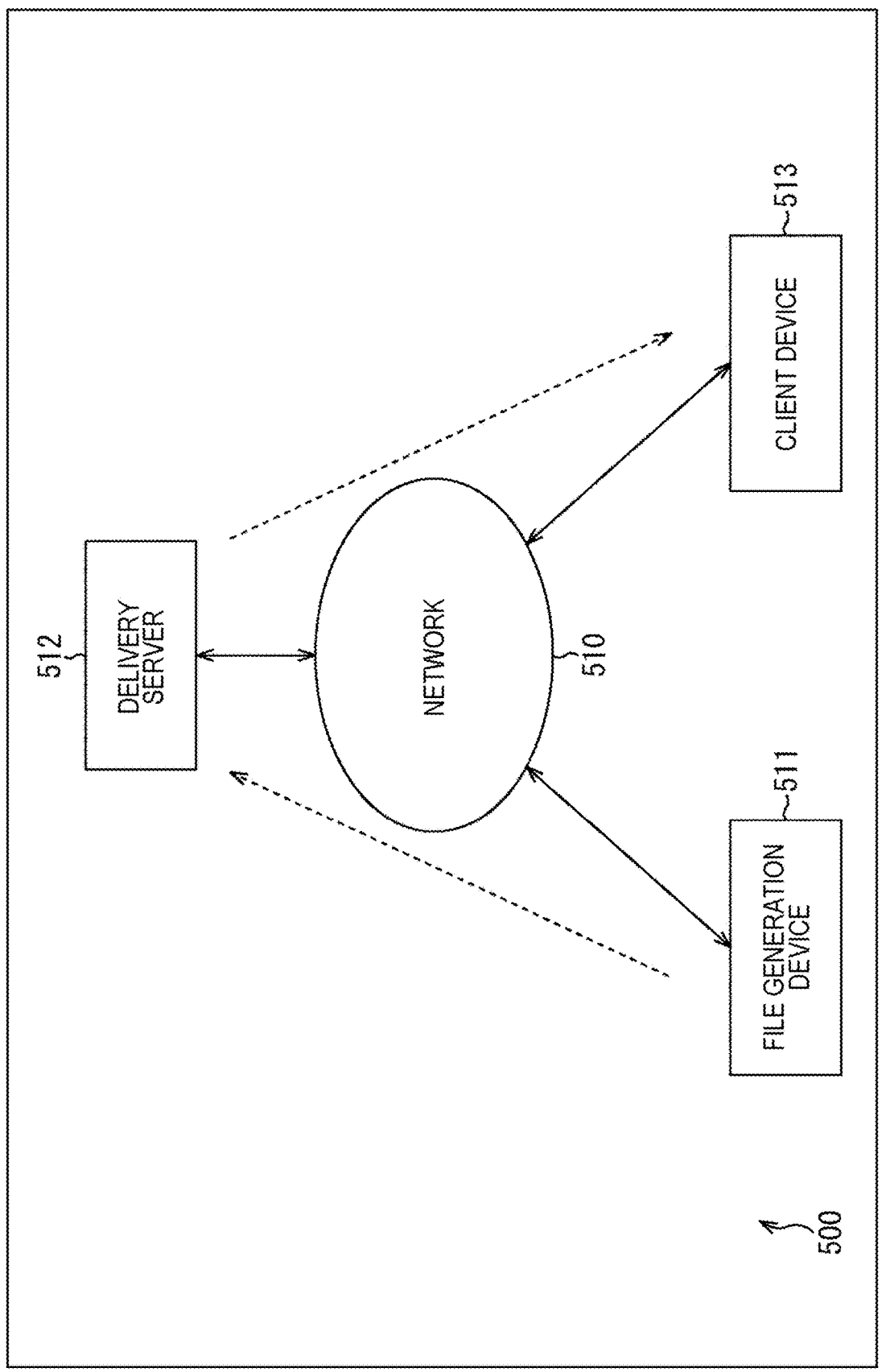
FIG. 23 is a diagram illustrating a main configuration example of a delivery system.

FIG. 23 is a block diagram illustrating a main configuration example of the delivery system. As illustrated in FIG. 23, a delivery system 500 includes a file generation device 511, a delivery server 512, and a client device 513, which are communicably connected to each other via a network 510. The delivery system 500 is a system in which the delivery server 512 delivers the content file generated by the file generation device 511 to the client device 513 by using MPEG-DASH. At that time, the delivery server 512 and the client device 513 implement adaptive content delivery, for example, with a bit rate or the like by using the MPD.

That is, the file generation device 511 generates a plurality of segment files having different bit rates and the like and an MPD as a content file of one content. The file generation device 511 uploads the segment files and MPD to the delivery server 512. Then, the delivery server 512 adaptively delivers the content with the bit rate or the like by using these files.

The client device 513 first acquires an MPD. Then, the client device 513 refers to information described in the MPD and selects a segment file having an optimum bit rate or the like from among a plurality of the segment files. Then, the client device 513 requests the delivery server 512 to deliver the selected segment file. The delivery server 512 delivers the requested segment file to the client device 513. The client device 513 receives the segment file, extracts and decodes a bitstream, and reproduces the obtained content.

Note that the network 510 is a communication network serving as a communication medium between the devices. The network 510 may be a communication network for wired communication, a communication network for wireless communication, or a communication network for both the wireless communication and wired communication. For example, the network may be a wired local area network (LAN), a wireless LAN, a public telephone line network, a wide area communication network for a wireless mobile body such as a so-called 4G line or 5G line, the Internet, or the like, or a combination thereof. Furthermore, the network 510 may be a single communication network or a plurality of communication networks. Furthermore, for example, a part or the entire of the network 510 may be configured by a communication cable of a predetermined standard, such as a universal serial bus (USB) (registered trademark) cable, a high-definition multimedia interface (HDMI) (registered trademark) cable, or the like.

Furthermore, in FIG. 23, one file generation device 511, one delivery server 512, and one client device 513 are illustrated, but the number of these devices is arbitrary.

The present technology may be applied to such a delivery system 500. That is, the above-described file generation device 300 (FIG. 19) may be applied as the file generation device 511. Furthermore, the above-described client device 400 (FIG. 21) may be applied as the client device 513.

That is, in the file generation device 511, the file generation unit 314 may further generate a content file storing the encoded data of the image and a control file (MPD) for controlling the delivery of the content file, and store the image quality improvement technology information in the control file.

Furthermore, in the client device 513, the file processing unit 412 may acquire the content file on the basis of the image quality improvement technology information stored in the control file (MPD) for controlling the delivery of the content file, and acquire the encoded data of an image to be reproduced from the acquired content file.

Other present technologies described above may be applied in <3. Provision of image quality improvement technology information>. Furthermore, a plurality of the present technologies may be appropriately combined and applied.

Since the image-quality-related technology information is stored in the MPD as described above, the client device 513 can easily use the image quality improvement technology required for reproducing the content before acquiring the content file. Thus, the client device 513 can select the segment file in consideration of the application of the image quality improvement technology.

Therefore, the delivery server 512 can provide a segment file that can be displayed with high quality at a low bit rate. That is, an increase in data transmission amount can be suppressed. In general, the cost of the CDN is charged for the amount of transmission from the CDN. Therefore, by applying the present technology as described above to suppress an increase in data transmission amount, an increase in cost can be suppressed. In addition, the delivery server 512 can provide a delivery service regardless of whether or not the client device 513 can apply the image quality improvement technology.

Furthermore, the client device 513 can ensure sufficient quality with a segment file of a low bit rate by applying the image quality improvement technology. Therefore, high-quality display can be performed even in a case where a transmission band is narrowed.

Furthermore, when the image quality improvement technology of the super-resolution technology can be applied, it is possible to perform high-quality display even when a segment file having a resolution lower than the resolution of the display of the client device 513 is reproduced.

Furthermore, for example, in the case of a service in which the client device 513 is charged for an amount of using the network, the increase in data transmission amount is suppressed by applying the present technology as described above, and thus it is possible to suppress an increase in the cost.

<Flow 2 of Reproduction Processing>

Figure 24:
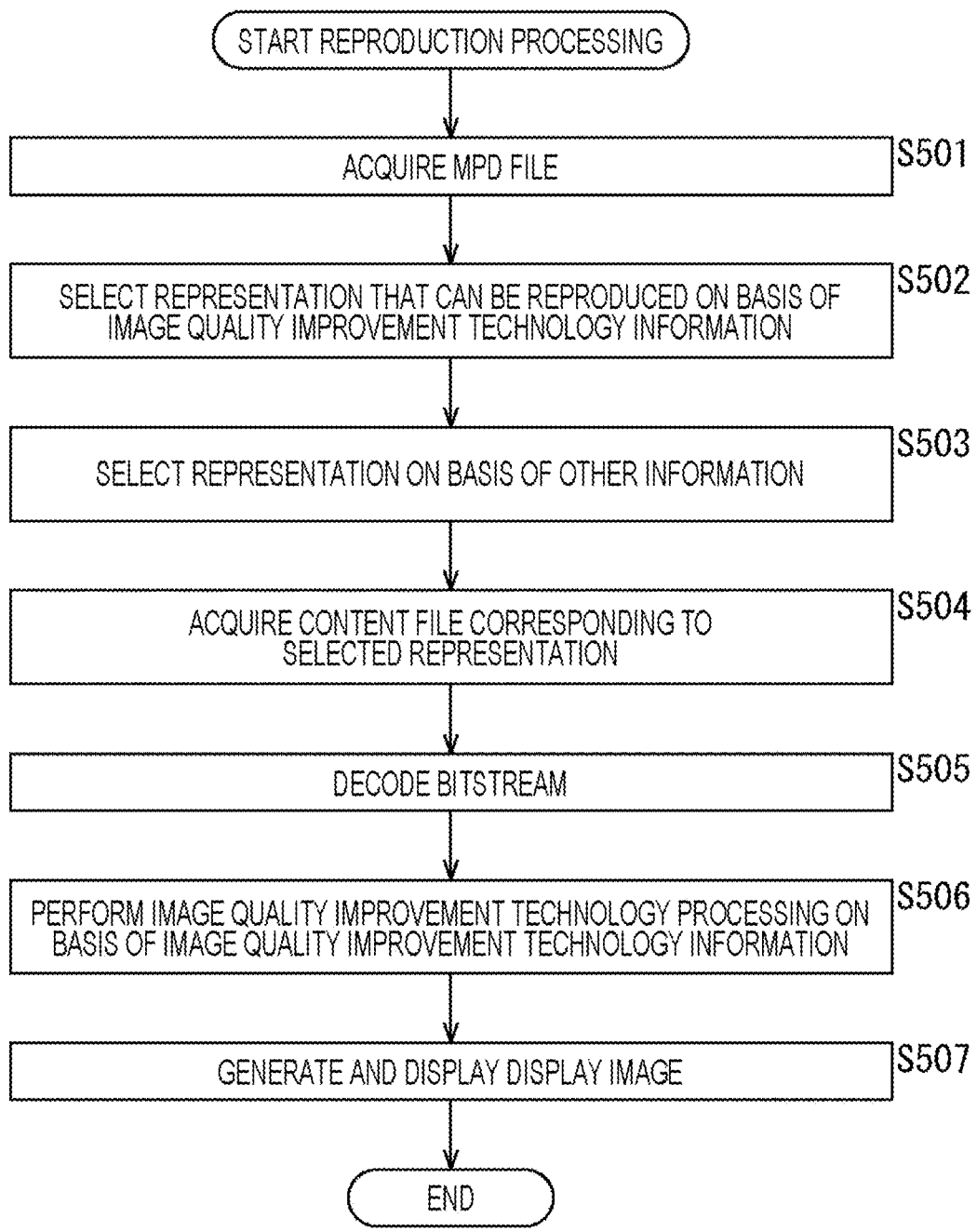
FIG. 24 is a flowchart illustrating an example of a flow of reproduction processing.

A flow of the file generation processing in this case is similar to the case described with reference to the flowchart of FIG. 20. Furthermore, an example of a flow of reproduction processing in this case will be described with reference to a flowchart of FIG. 24.

When the reproduction processing is started, the file processing unit 412 of the client device 400 acquires an MPD via the file acquisition unit 411 in step S501.

In step S502, the file processing unit 412 selects a Representation that can be reproduced on the basis of the image quality improvement technology information stored in the MPD acquired in step S501.

In step S503, on the basis of other information, the file processing unit 412 selects the Representation to be reproduced from among the Representations that are selected in step S502 and can be reproduced.

In step S504, the file processing unit 412 acquires a content file corresponding to the selected Representation via the file acquisition unit 411. The file processing unit 412 acquires a bitstream included in the content file acquired in step S504. That is, the file processing unit 412 acquires the content file on the basis of the image quality improvement technology information stored in the control file (MPD) for controlling the delivery of the content file, and acquires the encoded data of an image to be reproduced from the acquired content file.

In step S505, the decoding unit 413 decodes the bitstream, and generates (restores) the image data.

In step S506, the display information generation unit 414 executes image quality improvement technology processing on the image data restored in step S505 on the basis of the image quality improvement technology.

In step S507, the display information generation unit 414 generates a display image. Then, the display information generation unit 414 supplies the display image to the display unit 415 and displays the display image. When the processing in step S507 ends, the reproduction processing ends.

As described above, in the reproduction processing, the present technology described above may be applied in <3. Provision of image quality improvement technology information>.

Other present technologies described above may be applied in <3. Provision of image quality improvement technology information>. Furthermore, a plurality of the present technologies may be appropriately combined and applied.

As described above, by executing each processing, the client device 400 can easily use the image quality improvement technology required for reproducing the content.

6. APPENDIX

<Computer>

The above-described series of processing can be executed by hardware or software. In a case where the series of processing is executed by software, a program constituting the software is installed in a computer. Here, examples of the computer include a computer that is built in dedicated hardware, and a general-purpose personal computer that can perform various functions by being installed with various programs.

FIG. 25 is a block diagram illustrating a configuration example of the hardware of the computer that executes the above-described series of processing by a program.

In a computer 900 illustrated in FIG. 25, a central processing unit (CPU) 901, a read only memory (ROM) 902, and a random access memory (RAM) 903 are mutually connected via a bus 904.

The bus 904 is further connected with an input/output interface 910. To the input/output interface 910, an input unit 911, an output unit 912, a storage unit 913, a communication unit 914, and a drive 915 are connected.

The input unit 911 includes, for example, a keyboard, a mouse, a microphone, a touch panel, and an input terminal. The output unit 912 includes, for example, a display, a speaker, and an output terminal. The storage unit 913 includes, for example, a hard disk, a RAM disk, and a nonvolatile memory. The communication unit 914 includes, for example, a network interface. The drive 915 drives a removable medium 921 such as a magnetic disk, an optical disk, a magneto-optical disk, or a semiconductor memory.

In the computer configured as described above, the series of processing described above are performed, for example, by the CPU 901 loading a program stored in the storage unit 913 into the RAM 903 via the input/output interface 910 and the bus 904, and executing the program. Furthermore, the RAM 903 also appropriately stores data necessary for the CPU 901 to execute various processing.

The program executed by the computer can be applied by being recorded on, for example, the removable medium 921 as a package medium or the like. In this case, by attaching the removable medium 921 to the drive 915, the program can be installed in the storage unit 913 via the input/output interface 910.

Furthermore, this program can also be provided via a wired or wireless transmission medium such as a local area network, the Internet, or digital satellite broadcasting. In this case, the program can be received by the communication unit 914 and installed in the storage unit 913.

Besides, the program can be installed in advance in the ROM 902 and the storage unit 913.

<Object to which the Present Technology is Applicable>

The present technology can be applied to any image encoding/decoding method.

Furthermore, the present technology can be applied to any configuration. For example, the present technology can be applied to various electronic devices.

Furthermore, for example, the present technology can also be implemented as a partial configuration of a device, such as a processor (for example, a video processor) as a system large scale integration (LSI) or the like, a module (for example, a video module) using a plurality of the processors or the like, a unit (for example, a video unit) using a plurality of the modules or the like, or a set (for example, a video set) obtained by further adding other functions to the unit.

Furthermore, for example, the present technology can also be applied to a network system including a plurality of devices. For example, the present technology may be implemented as cloud computing shared and processed in cooperation by a plurality of devices via a network. For example, the present technology may be implemented in a cloud service that provides a service related to an image (moving image) to any terminal such as a computer, an audio visual (AV) device, a portable information processing terminal, or an Internet of Things (IoT) device.

Note that in the present specification, a system means a set of a plurality of components (devices, modules (parts), and the like), and it does not matter whether or not all the components are in the same housing. Therefore, both of a plurality of devices stored in different housings and connected via a network, and one device in which a plurality of modules is stored in one housing are systems.

<Field and Use to which Present Technology is Applicable>

The system, device, processing unit and the like to which the present technology is applied can be used in arbitrary fields such as traffic, medical care, crime prevention, agriculture, livestock industry, mining, beauty care, factory, household appliance, weather, and natural surveillance, for example. Furthermore, any application thereof may be used.

For example, the present technology can be applied to systems and devices used for providing content for appreciation and the like. Furthermore, for example, the present technology can also be applied to systems and devices used for traffic, such as traffic condition management and automated driving control. Moreover, for example, the present technology can also be applied to systems and devices used for security. Furthermore, for example, the present technology can be applied to systems and devices used for automatic control of a machine or the like. Moreover, for example, the present technology can also be applied to systems and devices provided for use in agriculture and livestock industry. Furthermore, the present technology can also be applied to systems and devices that monitor, for example, the status of nature such as a volcano, a forest, and the ocean, wildlife, and the like. Moreover, for example, the present technology can also be applied to systems and devices used for sports.

<Others>

Note that in this specification, the "flag" is information for identifying a plurality of states, and includes not only information used for identifying two states of true (1) and false (0) but also information capable of identifying three or more states. Therefore, the value that may be taken by the "flag" may be, for example, a binary of 1/0 or a ternary or more. That is, the number of bits forming this "flag" is arbitrary, and may be one bit or a plurality of bits. Furthermore, for the identification information (including the flag), in addition to a form in which the identification information is included in a bitstream, a form is assumed in which difference information of the identification information with respect to a certain reference information is included in the bitstream. Therefore, in the present specification, the "flag" and the "identification information" include not only the information thereof but also the difference information with respect to the reference information.

Furthermore, various types of information (such as metadata) related to encoded data (bitstream) may be transmitted or recorded in any form as long as it is associated with the encoded data. Herein, the term "associate" is intended to mean to make, when processing one data, the other data available (linkable), for example. That is, the data associated with each other may be collected as one data or may be made individual data. For example, information associated with the encoded data (image) may be transmitted on a transmission path different from that of the encoded data (image). Furthermore, for example, the information associated with the encoded data (image) may be recorded in a recording medium different from that of the encoded data (image) (or another recording area of the same recording medium). Note that this "association" may be not the entire data but a part of data. For example, an image and information corresponding to the image may be associated with each other in any unit such as a plurality of frames, one frame, or a part within a frame.

Note that in the present specification, terms such as "synthesize", "multiplex", "add", "integrate", "include", "store", "put in", "introduce", "insert", and the like mean, for example, to combine a plurality of objects into one, such as to combine encoded data and metadata into one data, and mean one method of "associating" described above.

Furthermore, the embodiments of the present technology are not limited to the above-described embodiments, and various modifications can be made without departing from the scope of the present technology.

For example, a configuration described as one device (or processing unit) may be divided and configured as a plurality of devices (or processing units). Conversely, configurations described above as a plurality of devices (or processing units) may be collectively configured as one device (or processing unit). Furthermore, a configuration other than the above-described configurations may be added to the configuration of each device (or each processing unit). Moreover, as long as a configuration and an operation of the entire system are substantially the same, a part of a configuration of one device (or processing unit) may be included in a configuration of another device (or another processing unit).

Furthermore, for example, the above-described program may be executed in any device. In that case, the device is only required to have a necessary function (a functional block or the like) such that necessary information can be obtained.

Furthermore, for example, each step of one flowchart may be executed by one device, or may be shared and executed by a plurality of devices. Furthermore, in a case where a plurality of processing is included in one step, the plurality of processing may be executed by one device, or may be shared and executed by a plurality of devices. In other words, a plurality of processes included in one step can also be executed as processes of a plurality of steps. On the contrary, processing described as a plurality of steps can be collectively executed as one step.

Furthermore, for example, in a program executed by the computer, processing of steps describing the program may be executed in a time-series order in the order described in the present specification, or may be executed in parallel or individually at a required timing such as when a call is made. That is, as long as there is no contradiction, the processing of each step may be executed in an order different from the above-described order. Moreover, this processing of steps describing program may be executed in parallel with processing of another program, or may be executed in combination with processing of another program.

Furthermore, for example, a plurality of technologies related to the present technology can be implemented independently as a single entity as long as there is no contradiction. A plurality of arbitrary present technologies can be implemented in combination. For example, part or all of the present technologies described in any of the embodiments can be implemented in combination with part or all of the present technologies described in other embodiments. Furthermore, a part or all of the present technologies described above may be implemented in combination with another technology not described above.

Note that the present technology can also have the following configuration.

(1) An information processing device including:
an image quality improvement technology information generation unit configured to generate image quality improvement technology information regarding an image quality improvement technology for improving an image quality of an image to be encoded; and a file generation unit configured to generate a content file storing the encoded data of the image and store the image quality improvement technology information in the content file.

(2) The information processing device according to (1), in which the image quality improvement technology information includes determination information for determining whether to apply the image quality improvement technology.

(3) The information processing device according to (2), in which the image quality improvement technology information includes parameter data applied in processing to which the image quality improvement technology is applied.

(4) The information processing device according to any one of (1) to (3), in which the file generation unit stores the image quality improvement technology information in a video track storing the image.

(5) The information processing device according to (4), in which the file generation unit stores the image quality improvement technology information in a box in a sample entry.

(6) The information processing device according to any one of (1) to (5), in which the file generation unit stores the image quality improvement technology information in a metadata track storing metadata.

(7) The information processing device according to any one of (1) to (6), in which the file generation unit further generates a control file for controlling a delivery of the content file and stores the image quality improvement technology information in the control file.

(8) The information processing device according to any one of (1) to (7), in which the image quality improvement technology information includes information regarding each partial region of the image.

(9) The information processing device according to any one of (1) to (8), in which the file generation unit associates the image quality improvement technology information with still image data stored in the content file.

(10) An information processing method including:

generating image quality improvement technology information regarding an image quality improvement technology for improving an image quality of an image to be encoded; and generating a content file storing the encoded data of the image and storing the image quality improvement technology information in the content file.

(11) An information processing device including:

an acquisition unit configured to acquire encoded data of an image to be reproduced from a content file on the basis of image quality improvement technology information regarding an image quality improvement technology for improving an image quality of the image; and a decoding unit configured to decode the encoded data.

(12) The information processing device according to (11), in which the image quality improvement technology information includes determination information for determining whether to apply the image quality improvement technology.

(13) The information processing device according to (12), in which the image quality improvement technology information includes parameter data applied in processing to which the image quality improvement technology is applied.

(14) The information processing device according to any one of (11) to (13), in which the acquisition unit acquires the encoded data of the image to be reproduced on the basis of the image quality improvement technology information stored in a video track in which the image is stored.

(15) The information processing device according to (14), in which the acquisition unit acquires the encoded data of the image to be reproduced on the basis of the image quality improvement technology information stored in a box in in a sample entry.

(16) The information processing device according to any one of (11) to (15), in which the acquisition unit acquires the encoded data of the image to be reproduced on the basis of the image quality improvement technology information stored in a metadata track storing metadata.

(17) The information processing device according to any one of (11) to (16), in which the acquisition unit acquires the content file on the basis of the image quality improvement technology information stored in a control file for controlling a delivery of the content file, and acquires the encoded data of the image to be reproduced from the acquired content file.

(18) The information processing device according to any one of (11) to (17), in which the image quality improvement technology information includes information regarding each partial region of the image.

(19) The information processing device according to any one of (11) to (18), in which the acquisition unit acquires still image data associated with the image quality improvement technology information.

(20) An information processing method including:

acquiring encoded data of an image to be reproduced from a content file on the basis of image quality improvement technology information regarding an image quality improvement technology for improving an image quality of the image; and decoding the encoded data.

REFERENCE SIGNS LIST

300 File generation device
301 Control unit
302 File generation processing unit
311 Input unit
312 Preprocessing unit
313 Encoding unit
314 File generation unit
315 Recording unit
316 Output unit
400 Client device
401 Control unit
402 Reproduction processing unit
411 File acquisition unit 412 File processing unit
413 Decoding unit
414 Display information generation unit
415 Display unit
416 Measurement unit
417 Display control unit

The invention claimed is:

1. An information processing device comprising:
an image quality improvement technology information generation unit circuitry configured to generate image quality improvement technology information regarding an image quality improvement technology for improving an image quality of an image to be encoded; and a file generation unit configured to generate a content file storing the encoded data of the image and store the image quality improvement technology information in the content file, wherein the image quality improvement technology information is usable by a client device to determine whether to apply the image quality improvement technology without parsing encoded data of the image.

2. The information processing device according to claim 1, wherein the image quality improvement technology information includes determination information for determining whether to apply the image quality improvement technology.

3. The information processing device according to claim 2, wherein the image quality improvement technology information includes parameter data applied in processing to which the image quality improvement technology is applied.

4. The information processing device according to claim 1, wherein the circuitry is configured to store the image quality improvement technology information in a video track storing the image.

5. The information processing device according to claim 4, wherein circuitry is configured to store the image quality improvement technology information in a box in a sample entry.

6. The information processing device according to claim 1, wherein circuitry is configured to store the image quality improvement technology information in a metadata track storing metadata.

7. The information processing device according to claim 1, wherein circuitry is configured to generate a control file for controlling a delivery of the content file and stores the image quality improvement technology information in the control file.

8. The information processing device according to claim 1, wherein the image quality improvement technology information includes information regarding each partial region of the image.

9. The information processing device according to claim 1, wherein the circuitry is configured to associate the image quality improvement technology information with still image data stored in the content file.

10. An information processing method comprising: generating image quality improvement technology information regarding an image quality improvement technology for improving an image quality of an image to be encoded; and generating a content file storing the encoded data of the image and storing the image quality improvement technology information in the content file, wherein the image quality improvement technology information is usable by a client device to determine whether to apply the image quality improvement technology without parsing encoded data of the image.

11. An information processing device comprising:
an acquisition circuit configured to acquire encoded data of an image to be reproduced from a content file on a basis of image quality improvement technology information regarding an image quality improvement technology for improving an image quality of the image, wherein the image quality improvement technology information is usable by a client device to determine whether to apply the image quality improvement technology without parsing encoded data of the image; and
a decoding circuit configured to decode the encoded data.

12. The information processing device according to claim 11, wherein the image quality improvement technology information includes determination information for determining whether to apply the image quality improvement technology.

13. The information processing device according to claim 12, wherein the image quality improvement technology information includes parameter data applied in processing to which the image quality improvement technology is applied.

14. The information processing device according to claim 11, wherein the acquisition unit acquires circuit is configured to acquire the encoded data of the image to be reproduced on a basis of the image quality improvement technology information stored in a video track in which the image is stored.

15. The information processing device according to claim 14, wherein the acquisition unit acquires circuit is configured to acquire the encoded data of the image to be reproduced on a basis of the image quality improvement technology information stored in a box in in a sample entry.

16. The information processing device according to claim 11, wherein the acquisition unit acquires circuit is configured to acquire the encoded data of the image to be reproduced on a basis of the image quality improvement technology information stored in a metadata track storing metadata.

17. The information processing device according to claim 11, wherein the acquisition unit acquires circuit is configured to acquire the content file on a basis of the image quality improvement technology information stored in a control file for controlling a delivery of the content file, and acquires the encoded data of the image to be reproduced from the acquired content file.

18. The information processing device according to claim 11, wherein the image quality improvement technology information includes information regarding each partial region of the image.

19. The information processing device according to claim 11, wherein the acquisition unit acquires circuit is configured to acquire still image data associated with the image quality improvement technology information.

20. An information processing method comprising:
acquiring encoded data of an image to be reproduced from a content file on a basis of image quality improvement technology information regarding an image quality improvement technology for improving an image quality of the image, wherein the image quality improvement technology information is usable by a client device to determine whether to apply the image quality improvement technology without parsing encoded data of the image; and
decoding the encoded data.

* * * * *